United States Patent
Suzuki

(10) Patent No.: US 10,920,108 B2
(45) Date of Patent: Feb. 16, 2021

(54) ADHESIVE SHEET

(71) Applicant: NITTO DENKO CORPORATION, Ibaraki (JP)

(72) Inventor: Toshihide Suzuki, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 101 days.

(21) Appl. No.: 15/515,191

(22) PCT Filed: Sep. 28, 2015

(86) PCT No.: PCT/JP2015/077351
§ 371 (c)(1),
(2) Date: Mar. 29, 2017

(87) PCT Pub. No.: WO2016/052424
PCT Pub. Date: Apr. 7, 2016

(65) Prior Publication Data
US 2017/0218231 A1    Aug. 3, 2017

(30) Foreign Application Priority Data

Sep. 30, 2014   (JP) ................................ 2014-200173
Sep. 18, 2015   (JP) ................................ 2015-185510

(51) Int. Cl.
| | | |
|---|---|---|
| *C09J 7/00* | (2018.01) | |
| *C09J 7/10* | (2018.01) | |
| *C09J 133/02* | (2006.01) | |
| *C08L 33/14* | (2006.01) | |
| *C09J 133/00* | (2006.01) | |

(52) U.S. Cl.
CPC ................ *C09J 7/10* (2018.01); *C08L 33/14* (2013.01); *C09J 133/00* (2013.01); *C09J 133/02* (2013.01); *C08L 2312/06* (2013.01); *C09J 2203/326* (2013.01); *C09J 2301/312* (2020.08); *C09J 2301/416* (2020.08); *C09J 2433/00* (2013.01); *C09K 2323/05* (2020.08); *C09K 2323/057* (2020.08); *C09K 2323/059* (2020.08)

(58) Field of Classification Search
CPC ....... C09J 7/00; C09J 7/38; C09J 7/385; C09J 133/00; C09J 133/066; C09J 133/04; C09J 2201/622; C09J 2203/326; C09J 2205/31; C09J 2433/006; C09J 2433/00; C09K 2323/05; C09K 2323/057; C09K 2323/059
USPC ........... 428/1.5, 1.54, 1.55, 243, 345, 355 R; 427/208.4
See application file for complete search history.

(56) References Cited

U.S. PATENT DOCUMENTS

| | | |
|---|---|---|
| 6,524,701 B1 | 2/2003 | Kondo et al. |
| 2006/0162857 A1* | 7/2006 | Nagamoto ............ C09J 133/08 156/272.8 |
| 2011/0045290 A1 | 2/2011 | Maeda et al. |
| 2011/0234948 A1 | 9/2011 | Yoon et al. |
| 2014/0160406 A1 | 6/2014 | Huh et al. |
| 2014/0178608 A1* | 6/2014 | Yoon ........................ G02F 1/13 428/1.55 |
| 2014/0302313 A1 | 10/2014 | Suwa et al. |
| 2016/0272848 A1 | 9/2016 | Suzuki et al. |

FOREIGN PATENT DOCUMENTS

| | | |
|---|---|---|
| CN | 105705602 A | 6/2016 |
| EP | 1 002 845 A2 | 5/2000 |
| EP | 2 735 594 A2 | 5/2014 |
| JP | 2000-212530 A | 8/2000 |
| JP | 2004-323858 A | 11/2004 |
| JP | 2009-138027 A | 6/2009 |
| JP | 2011-095318 A | 5/2011 |
| JP | 2011-145683 A | 7/2011 |
| JP | 2013-040256 A | 2/2013 |
| JP | 2014-129491 A | 7/2014 |
| WO | 2009/110426 A1 | 9/2009 |
| WO | 2013/027980 A2 | 2/2013 |

OTHER PUBLICATIONS

International Search Report of PCT/JP2015/077351 dated Dec. 8, 2015.
Notification of Reasons for Refusal dated May 7, 2019, from the Japanese Patent Office in counterpart Application No. 2015-185510.
Communication dated Mar. 13, 2019 from the Taiwanese Patent Office in application No. 104132237.
First Office Action dated Jul. 2, 2019 from the State Intellectual Property Office of the P.R.C. in counterpart Application No. 201580053310.2.

* cited by examiner

*Primary Examiner* — Ruiyun Zhang
(74) *Attorney, Agent, or Firm* — Sughrue Mion, PLLC

(57) ABSTRACT

A pressure-sensitive adhesive sheet according to the present invention includes an irradiation-curable acrylic pressure-sensitive adhesive layer. The acrylic pressure-sensitive adhesive layer includes an acrylic polymer and a multifunctional acrylic oligomer. The acrylic pressure-sensitive adhesive layer, after curing, has a Young's modulus of 500 kPa to 10000 kPa at 23° C. The acrylic pressure-sensitive adhesive layer, after curing, has an adhesive strength of 3.0 N/20 mm or more. The acrylic pressure-sensitive adhesive layer before curing may have an adhesive strength of typically 3.0 N/20 mm or more. The acrylic pressure-sensitive adhesive layer before curing may have a Young's modulus of typically 30 kPa to 200 kPa at 23° C.

17 Claims, No Drawings

ADHESIVE SHEET

CROSS REFERENCE TO RELATED APPLICATIONS

This application is a National Stage of International Application No. PCT/JP2015/077351 filed Sep. 28, 2015, claiming priority based on Japanese Patent Application No. 2014-200173 filed Sep. 30, 2014 and Japanese Patent Application No. 2015-185510 filed Sep. 18, 2015, the contents of all of which are incorporated herein by reference in their entirety.

TECHNICAL FIELD

The present invention relates to a pressure-sensitive adhesive sheet (self-adhesive sheet) which features compatibility between force transmissibility and adhesiveness.

BACKGROUND ART

Pressure-sensitive adhesive layers (self-adhesive layers) of pressure-sensitive adhesive sheets are layers including pressure-sensitive adhesives (self-adhesive agents). The pressure-sensitive adhesives are generally viscoelastic articles. In general, the pressure-sensitive adhesives have a property of relaxing external force when the force acts thereon. For example, there are known pressure-sensitive adhesive sheets (impact-absorbing pressure-sensitive adhesive sheets) which absorb externally-applied impact and which transmit less impact force (Patent Literature (PTL) 1 and PTL 2).

CITATION LIST

Patent Literature

PTL 1: Japanese Unexamined Patent Application Publication (JP-A) No. 2011-95318
PTL 2: JP-A No. 2011-145683

SUMMARY OF INVENTION

Technical Problem

However, some pressure-sensitive adhesive sheets may require transmission of externally-applied force while the pressure-sensitive adhesive sheets do not relax the force, or less relax or attenuate the force. For example, pressure-sensitive adhesive sheets for coupling or securing of parts/components may require efficient transmission of force, which acts on one part/component, via the pressure-sensitive adhesive sheets to another part/component in some usage modes of finished products. Pressure-sensitive adhesive sheets for protecting touch screen (touch panel) surfaces may require efficient transmission of force to the screens (panels) from the viewpoint of response sensitivity of touch operations to the screens. Pressure-sensitive adhesive sheets for use in sensors or other electronic devices may require efficient transmission of force, which act on the pressure-sensitive adhesive sheets, to adherends from the viewpoint of not adversely affecting the sensing of the sensors.

On the other hand, pressure-sensitive adhesive sheets require adhesive force (bond strength) at certain level so as not to undergo unintentional peeling from adherends.

The present invention has been made under these circumstances and has an object to provide a pressure-sensitive adhesive sheet which has satisfactory adhesive force and is still suitable for efficient transmission of external force to an adherend, where the external force acts on the pressure-sensitive adhesive sheet.

Solution to Problem

After intensive investigations to achieve the object, the inventor of the present invention found that a pressure-sensitive adhesive sheet, when including a specific pressure-sensitive adhesive layer, has sufficient adhesiveness and, when receiving external force, is still suitable for efficiently transmitting the force while less causing relaxation and attenuation of the force. The specific pressure-sensitive adhesive layer is an acrylic pressure-sensitive adhesive layer which is curable by irradiation (radiation exposure) and contains an acrylic polymer and a multifunctional acrylic oligomer. The acrylic pressure-sensitive adhesive layer, when being cured, has a Young's modulus of 500 kPa or more at 23° C. and an adhesive strength of 3.0 N/20 ram or more. The present invention has been made based on these findings.

Specifically, the present invention provides a pressure-sensitive adhesive sheet including an acrylic pressure-sensitive adhesive layer. The acrylic pressure-sensitive adhesive layer is curable by irradiation (is optionally cured by irradiation) and includes an acrylic polymer and a multifunctional acrylic oligomer. The acrylic pressure-sensitive adhesive layer, after curing, has a Young's modulus of 500 kPa to 10000 kPa at 23° C. The acrylic pressure-sensitive adhesive layer, after curing, has an adhesive strength of 3.0 N/20 mm or more.

In the pressure-sensitive adhesive sheet according to the present invention, the acrylic pressure-sensitive adhesive layer before curing preferably has an adhesive strength of 3.0 N/20 mm or more.

The acrylic pressure-sensitive adhesive layer before curing preferably has a Young's modulus of 30 kPa to 200 kPa at 23° C.

Preferably, the acrylic pressure-sensitive adhesive layer, after curing, has a gel fraction of 70 mass percent or more.

The acrylic polymer in the acrylic pressure-sensitive adhesive layer is preferably derived from monomer components including 0.5 to 30 mass percent of one or more nitrogen-containing monomers.

The acrylic polymer in the acrylic pressure-sensitive adhesive layer is preferably derived from monomer components including 1 to 30 mass percent of one or more hydroxy-containing monomers.

The acrylic polymer in the acrylic pressure-sensitive adhesive layer is preferably derived from monomer components substantially free from acidic-group-containing monomers.

The acrylic polymer in the acrylic pressure-sensitive adhesive layer preferably has a weight-average molecular weight of $40 \times 10^4$ to $200 \times 10^4$.

The multifunctional acrylic oligomer in the acrylic pressure-sensitive adhesive layer preferably contains two or more (meth)acryloyl groups per molecule.

The multifunctional acrylic oligomer in the acrylic pressure-sensitive adhesive layer is preferably at least one substance selected from the group consisting of polyester (meth)acrylates, epoxy (meth)acrylates, urethane (meth)acrylates, and bisphenol-A ethylene oxide adduct diacrylates.

The multifunctional acrylic oligomer in the acrylic pressure-sensitive adhesive layer preferably has a weight-average molecular weight of 400 to 10000.

The multifunctional acrylic oligomer in the acrylic pressure-sensitive adhesive layer preferably gives a homopolymer having a hardness of 4B or more as measured in conformity with JIS K 5600-5-4.

The acrylic pressure-sensitive adhesive layer preferably further includes a photoinitiator. In this case, the acrylic pressure-sensitive adhesive layer preferably includes 0.05 to 40 parts by mass of the multifunctional acrylic oligomer and 0.05 to 5 parts by mass of the photoinitiator, each per 100 parts by mass of the acrylic polymer.

The acrylic pressure-sensitive adhesive layer preferably further includes 0.05 to 5 parts by mass of one or more crosslinkers per 100 parts by mass of the acrylic polymer.

The acrylic pressure-sensitive adhesive layer preferably further includes 0.01 to 1 part by mass of one or more silage coupling agents per 100 parts by mass of the acrylic polymer.

Advantageous Effects of Invention

The pressure-sensitive adhesive sheet according to the present invention has satisfactory adhesive force and, when receiving external force, is still suitable for efficient transmission of the force to an adherend or adherends.

DESCRIPTION OF EMBODIMENTS

The pressure-sensitive adhesive sheet according to the present invention includes an acrylic pressure-sensitive adhesive layer which includes an acrylic polymer and a multifunctional acrylic oligomer and which is curable by irradiation. In the pressure-sensitive adhesive sheet according to the present invention, the acrylic pressure-sensitive adhesive layer, after curing, has a Young's modulus of 500 kPa to 10000 kPa at 23° C. and an adhesive strength of 3.0 N/20 mm or more. As used herein the term "pressure-sensitive adhesive sheet according to the present invention" also includes a pressure-sensitive adhesive tape in the form of a tape. In this description, such an acrylic pressure-sensitive adhesive layer meeting conditions (a) to (d) is also referred to as an "acrylic pressure-sensitive adhesive layer A". The conditions (a) to (d) are expressed as follows:

(a) curable by irradiation;
(b) including an acrylic polymer and a multifunctional acrylic oligomer;
(c) having, after curing by irradiation, a Young's modulus of 500 kPa to 10000 kPa at 23° C.; and
(d) having, after curing by irradiation, an adhesive strength of 3.0 N/20 mm or more.

The pressure-sensitive adhesive sheet according to the present invention is not limited in its form, as long as having an adhesive face provided by a surface of the acrylic pressure-sensitive adhesive layer A. The pressure-sensitive adhesive sheet according to the present invention may be a single-sided pressure-sensitive adhesive sheet having an adhesive face as only one side thereof; or may be a double-sided pressure-sensitive adhesive sheet caving adhesive faces as both sides thereof. Assume that the pressure-sensitive adhesive sheet according to the present invention is a double-sided pressure-sensitive adhesive sheet. This pressure-sensitive adhesive sheet may be in such a form that the both adhesive faces are provided by the acrylic pressure-sensitive adhesive layer (s) A; or may be in such a form that one of the two adhesive faces is provided by the acrylic pressure-sensitive adhesive layer A, and the other is provided by a pressure-sensitive adhesive layer (another pressure-sensitive adhesive layer) other than the acrylic pressure-sensitive adhesive layer A. From the viewpoint of laminating adherends with each other, the pressure-sensitive adhesive sheet according to the present invention is preferably in the form of a double-sided pressure-sensitive adhesive sheet.

The pressure-sensitive adhesive sheet according to the present invention may be a transfer pressure-sensitive adhesive sheet or a substrate-supported pressure-sensitive adhesive sheet. The "transfer pressure-sensitive adhesive sheet" refers to a pressure-sensitive adhesive sheet devoid of substrates (substrate layers; base layers), namely, a so-called "transfer" (substrate-less) pressure-sensitive adhesive sheet. The "substrate-supported pressure-sensitive adhesive sheet" refers to a pressure-sensitive adhesive sheet including a substrate. Non-limiting examples of the transfer pressure-sensitive adhesive sheet in the present invention include a double-sided pressure-sensitive adhesive sheet including the acrylic pressure-sensitive adhesive layer A alone; and a double-sided pressure-sensitive adhesive sheet including the acrylic pressure-sensitive adhesive layer A and another pressure-sensitive adhesive layer (a pressure-sensitive adhesive layer other than the acrylic pressure-sensitive adhesive layer). Non-limiting examples of the substrate-supported pressure-sensitive adhesive sheet in the present invention include a single-sided pressure-sensitive adhesive sheet including a substrate, and the acrylic pressure-sensitive adhesive layer A disposed on one side of the substrate; a double-sided pressure-sensitive adhesive sheet including a substrate, and the acrylic pressure-sensitive adhesive layers A disposed on both sides of the substrate; and a double-sided pressure-sensitive adhesive sheet including a substrate, the acrylic pressure-sensitive adhesive layer A disposed on one side of the substrate, and another pressure-sensitive adhesive layer disposed on the other side. As used herein, the term "substrate (substrate layer)" refers to a base material (support or backing) and is a portion that is applied, together with a pressure-sensitive adhesive layer, to an adherend when the pressure-sensitive adhesive sheet is used as being applied to the adherend. Separators (release liners), which are removed upon use (application) of the pressure-sensitive adhesive sheet, are not included in the "substrate".

The pressure-sensitive adhesive sheet according to the present invention may bear a separator (release liner) so as to protect the adhesive face or faces. The pressure-sensitive adhesive sheet according to the present invention may further include one or more other layers within ranges not adversely affecting the advantageous effects of the present invention. Non-limiting examples of such other layers include intermediate layers and under coat layers.

The pressure-sensitive adhesive sheet according to the present invention may be in the form of a wound roll, or in the form of a laminate of two or more sheets. For example, the pressure-sensitive adhesive sheet may be in the form of a roll in which an adhesive face is protected by a separator; or may be in the form of a roll in which the pressure-sensitive adhesive sheet has a multilayer structure including a substrate and a pressure-sensitive adhesive layer, and the adhesive face of the pressure-sensitive adhesive layer is protected by a release coat layer (backing layer) disposed on the substrate backside. Non-limiting examples of a release agent for use in the formation of the release coat layer (backing layer) on the substrate backside include silicone release agents and long-chain alkyl release agents.

Acrylic Pressure-Sensitive Adhesive Layer A

The acrylic pressure-sensitive adhesive layer A is cured by irradiation (with radiation (radioactive rays)). For example, when the pressure-sensitive adhesive sheet according to the present invention is applied to an adherend and is then irradiated, the acrylic pressure-sensitive adhesive layer A is cured. Assume that force is applied to an adherend with the pressure-sensitive adhesive sheet including the cured acrylic pressure-sensitive adhesive layer A through the pressure-sensitive adhesive sheet. In this case, the pressure-sensitive adhesive sheet can satisfactorily transmit the force to the adherend.

The acrylic pressure-sensitive adhesive layer A includes an acrylic polymer and a multifunctional acrylic oligomer, where the multifunctional acrylic oligomer is a reactive oligomer component. The multifunctional acrylic oligomer undergoes a radical reaction upon irradiation, and this allows the acrylic pressure-sensitive adhesive layer A to be cured by irradiation.

Non-limiting examples of the radiation for use in curing include ionizing radiation such as alpha rays, beta rays, gamma rays, X rays, neutron beams, and electron beams; and ultraviolet rays. From the viewpoint of cost, ultraviolet rays are preferred, of which ultraviolet rays having a wavelength of 200 to 400 nm are more preferred. Non-limiting examples of a light source usable for ultraviolet irradiation include high-pressure mercury lamps, low-pressure mercury lamps, microwave-excited lamps, metal halide lamps, chemical lamps, black light lamps, and LEDs. Energy, time, and method of irradiation with the radiation for curing can be set as appropriate, as long as the acrylic pressure-sensitive adhesive layer A can be cured, and as long as the irradiation does not adversely affect the adherend or adherends. For example, when an ultraviolet ray is used as the radiation for curing, the irradiation may be performed at an irradiance (cumulative dose) of preferably 1000 $mJ/cm^2$ to 10000 $mJ/cm^2$, and more preferably 2000 $mJ/cm^2$ to 4000 $mJ/cm^2$.

The acrylic pressure-sensitive adhesive layer A is formed from (derived from) a pressure-sensitive adhesive composition. As used herein, the term "pressure-sensitive adhesive composition" refers to a composition which is used to form a pressure-sensitive adhesive layer and also includes a composition which is used to form a pressure-sensitive adhesive. The pressure-sensitive adhesive composition to form the acrylic pressure-sensitive adhesive layer A may be selected from pressure-sensitive adhesive compositions in any form. Non-limiting examples of such pressure-sensitive adhesive compositions in various forms include emulsion-form, solvent-borne (solution form), actinic-radiation-curable, and heat-fusible (hot-melt) pressure-sensitive adhesive compositions. Among them, solvent-borne pressure-sensitive adhesive compositions are preferred.

The acrylic pressure-sensitive adhesive layer A includes an acrylic polymer and a multifunctional acrylic oligomer, as described above, and includes the acrylic polymer as a principal component. The acrylic pressure-sensitive adhesive layer A may contain the acrylic polymer in a content not limited, but preferably 60 mass percent or more, more preferably 70 mass percent or more, and furthermore preferably 80 mass percent or more, of the total amount (total mass, 100 mass percent) of the acrylic pressure-sensitive adhesive layer A. The content within the range is preferred from the viewpoint of allowing the acrylic pressure-sensitive adhesive layer A to offer sufficient bonding reliability.

Preferred, but non-limiting examples of monomer components to constitute the acrylic polymer in the acrylic pressure-sensitive adhesive layer A include (meth)acrylic alkyl esters each containing a linear or branched chain alkyl group. Specifically, the acrylic polymer is preferably a polymer derived from monomer components including, as an essential monomer component, a (meth)acrylic alkyl ester containing a linear or branched chain alkyl group. In other words, the acrylic polymer is preferably a polymer including a constitutional unit or monomer unit derived from a (meth)acrylic alkyl ester containing a linear or branched chain alkyl group. The acrylic polymer may be derived from monomer components further including one or more copolymerizable monomers such as nitrogen-containing monomers and hydroxy-containing monomers. Specifically, the acrylic polymer may be an acrylic copolymer including one or more constitutional units derived from copolymerizable monomers such as nitrogen-containing monomers and hydroxy-containing monomers. As used herein, the term "(meth)acrylic" refers to "acrylic" and/or "methacrylic", namely, refers to "acrylic", or "methacrylic", or both "acrylic" and "methacrylic".

The (meth)acrylic alkyl ester is a principal monomer component to constitute the acrylic polymer and plays a role in developing fundamental properties, such as adhesiveness, as a pressure-sensitive adhesive (or pressure-sensitive adhesive layer). An acrylic alkyl ester tends to impart flexibility to the acrylic polymer, which will serve as a base polymer. Accordingly, the acrylic alkyl ester tends to effectively allow the acrylic pressure-sensitive adhesive layer A to develop adhesion and tackiness. A methacrylic alkyl ester tends to impart hardness to the acrylic polymer, which will serve as a base polymer, and therefore tends to effectively allow the acrylic pressure-sensitive adhesive layer A to develop removability and force transmissibility.

The (meth)acrylic alkyl ester containing a linear or branched chain alkyl group is hereinafter also simply referred to as a "(meth)acrylic alkyl ester". Non-limiting examples of the (meth)acrylic alkyl ester include (meth)acrylic alkyl esters each containing a $C_1$-$C_{20}$ alkyl group, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among them, the (meth)acrylic alkyl ester is preferably selected from (meth)acrylic alkyl esters each containing a $C_1$-$C_{14}$ alkyl group, and is more preferably selected from the group consisting of n-butyl acrylate (BA), 2-ethylhexyl acrylate (2EHA), methyl methacrylate (MMA), methyl acrylate (MA), ethyl acrylate (EA), isooctyl acrylate, and isononyl acrylate. The acrylic polymer for use in the embodiment may be derived from each monomer component alone, or monomer components including any of different (meth)acrylic alkyl esters in combination.

The content of the (meth)acrylic alkyl ester or esters in the monomer components to constitute the acrylic polymer is not limited, but is preferably 50 mass percent or more, and more preferably 60 mass percent or more, of the total amount (100 mass percent) of the monomer components. The content of the (meth)acrylic alkyl ester or esters is preferably 100 mass percent or less, more preferably 90 mass percent or less, and furthermore preferably $0 mass percent or less.

As described above, the acrylic polymer may be derived from monomer components further including one or more copolymerizable monomers in addition to the (meth)acrylic alkyl ester or esters. The acrylic polymer in the embodiment may be derived from each monomer component alone, or monomer components including any of different copolymerizable monomers in combination.

The copolymerizable monomers are not limited, but are preferably selected from hydroxy-containing monomers. The term "hydroxy-containing monomer" refers to a monomer containing at least one hydroxy group per molecule. Assume that the monomer components to constitute the acrylic polymer include a hydroxy containing monomer, namely, the acrylic polymer includes a monomer unit derived from a hydroxy-containing monomer. This configuration may allow the acrylic pressure-sensitive adhesive layer A to readily offer adhesiveness and appropriate cohesive force. Also assume that the acrylic polymer includes a monomer unit derived from a hydroxy-containing monomer, and the acrylic pressure-sensitive adhesive layer A includes a crosslinker (curing agent) such as an isocyanate crosslinker. This configuration allows hydroxy-containing monomer units to crosslink through the crosslinker and thereby allows the acrylic pressure-sensitive adhesive layer A to readily offer hardness and satisfactory bonding reliability. The hardness of the acrylic pressure-sensitive adhesive layer A contributes to better workability of the acrylic pressure-sensitive adhesive layer A before curing by radiation; and to better force transmissibility of the acrylic pressure-sensitive adhesive layer A after radiation curing. The acrylic polymer for use in the embodiment may be derived from each monomer component alone, or monomer components including any of different hydroxy-containing monomers in combination.

Non-limiting examples of the hydroxy-containing monomer include hydroxy-containing (meth)acrylic esters, vinyl alcohol, and allyl alcohol. Non-limiting examples of the hydroxy-containing (meth)acrylic; esters include 2-hydroxyethyl (meth)acrylate, 3-hydroxypropyl (meth)acrylate, 4-hydroxybutyl (meth)acrylate, 6-hydroxyhexyl (meth)acrylate, hydroxyoctyl (meth)acrylates, hydroxydecyl (meth)acrylates, hydroxylauryl (meth)acrylates, and [4-(hydroxymethyl)cyclohexyl]methyl (meth)acrylate. The hydroxy containing (meth)acrylic esters are preferably selected from hydroxy-containing (meth)acrylic esters, and are more preferably selected from the group consisting of 2-hydroxyethyl acrylate and 4-hydroxybutyl acrylate.

The monomer components to constitute the acrylic polymer may contain the hydroxy-containing monomer in a content not limited, but preferably 1 mass percent or more, more preferably 2 mass percent or more, and furthermore preferably 5 mass percent or more, of the total amount (100 mass percent) of the monomer components. The content within the range is preferred from the viewpoint of allowing the acrylic pressure-sensitive adhesive layer A to offer sufficient adhesiveness and appropriate cohesive force. When the acrylic pressure-sensitive adhesive layer A includes a crosslinker such as an isocyanate crosslinker, the content within the range is preferred from the viewpoint of allowing the pressure-sensitive adhesive layer to offer hardness and satisfactory bonding reliability. The content of the hydroxy-containing monomer is preferably 30 mass percent or less, more preferably 25 mass percent or less, and furthermore preferably 20 mass percent or less. The content within the range is preferred from the viewpoint of less causing the acrylic pressure-sensitive adhesive layer A to become excessively hard and allowing the pressure-sensitive adhesive layer to offer satisfactory bonding reliability.

Preferred, but non-limiting examples of the copolymerizable monomer also include nitrogen-containing monomers. The term "nitrogen-containing monomer" refers to a monomer containing at least one nitrogen atom per molecule. In this description, such nitrogen-containing monomers are not included in the hydroxy-containing monomers. Specifically, in the description, monomers containing both at least one hydroxy group and at least one nitrogen atom per molecule are included not in the hydroxy-containing monomers, but in the nitrogen-containing monomers. Assume that the monomer components to constitute the acrylic polymer include one or more nitrogen-containing monomers, namely, the acrylic polymer includes one or more monomer units derived from nitrogen-containing monomers. This configuration allows the acrylic pressure-sensitive adhesive layer A to readily offer hardness, transparency, appropriate cohesive force, adhesiveness, and excellent bonding reliability. The hardness of the acrylic pressure-sensitive adhesive layer A contributes to better force transmissibility of the acrylic pressure-sensitive adhesive layer A after radiation curing. The acrylic pressure-sensitive adhesive layer A tends to have better transparency when the acrylic polymer includes a nitrogen-containing monomer unit, as compared with one devoid of nitrogen-containing monomer units. This is probably because the acrylic polymer, when including a nitrogen-containing monomer unit, has better compatibility with the multifunctional acrylic oligomer. The acrylic polymer for use in the embodiment may be derived from each monomer component alone, or monomer components including any of different nitrogen-containing monomers in combination.

Non-limiting examples of the nitrogen-containing monomer include cyclic N-vinylamides and (meth)acrylamides.

Non-limiting examples of the cyclic N-vinylamides include cyclic N-vinylamides represented by Formula (1):

[Chem. 1]

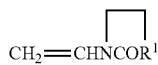

(1)

where $R^1$ represents a divalent organic group.

$R^1$ in Formula (1) is a divalent organic group and is preferably selected from divalent saturated hydrocarbon groups and unsaturated hydrocarbon groups, and is more preferably selected from $C_3$-$C_5$ alkylene groups.

Non-limiting examples of the cyclic N-vinylamides represented by Formula (1) include N-vinyl-2-pyrrolidone, N-vinyl-2-piperidone, N-vinyl-3-morpholinone, N-vinyl-2-caprolactam, N-vinyl-1,3-oxazin-2-one, and N-vinyl-3,5-morpholinedione.

Examples of the (meth)acrylamides include, but are not limited to, (meth)acrylamide, N-alkyl(meth)acrylamides, and N,N-dialkyl(meth)acrylamides. Non-limiting examples of the N-alkyl(meth)acrylamides include N-ethyl(meth)acrylamide, N-isopropyl(meth)acrylamide, N-n-butyl(meth)acrylamide, and N-octyl(meth)acrylamide. Non-limiting examples of the N-alkyl(meth)acrylamides also include amino-containing (meth)acrylamides such as dimethylaminoethyl(meth)acrylamide, diethylaminoethyl(meth)acrylamide, and dimethylaminopropyl(meth)acrylamide. Non-limiting examples of the N,N-dialkyl(meth)acrylamides include N,N-dimethyl(meth)acrylamide, N,N-diethyl(meth)acrylamide, N,N-dipropyl(meth)acrylamide, N,N-diisopropyl(meth)acrylamide, N,N-di-(n-butyl) (meth)acrylamide, and N,N-di-(t-butyl) (meth)acrylamide.

Examples of the (meth)acrylamides also include, but are not limited to, various N-hydroxyalkyl(meth)acrylamides. Non-limiting examples of such N-hydroxyalkyl(meth)acrylamides include N-methylol(meth)acrylamide, N-(2-hydroxyethyl) (meth)acrylamide, N-(2-hydroxypropyl) (meth)acrylamide, N-(1-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, and N-methyl-N-2-hydroxyethyl(meth)acrylamide.

Examples of the (meth)acrylamides also include, but are not limited to, various N-alkoxyalkyl(meth)acrylamides. Non-limiting examples of the N-alkoxyalkyl(meth)acrylamides include N-methoxymethyl(meth)acrylamide and N-butoxymethyl(meth)acrylamide.

Examples of nitrogen-containing monomers other than the cyclic N-vinylamides and the (meth)acrylamides include, but are not limited to, amino-containing monomers, cyano-containing monomers, heterocycle-containing monomers, imido-containing monomers, and isocyanate-containing monomers. Non-limiting examples of the amino-containing monomers include aminoethyl (meth)acrylate, dimethylaminoethyl (meth)acrylate, dimethylaminopropyl (meth)acrylate, and t-butylaminoethyl (meth)acrylate. Non-limiting examples of the cyano-containing monomers include acrylonitrile and methacrylonitrile. Non-limiting examples of the heterocycle-containing monomers include (meth)acryloylmorpholine, N-vinylpiperazine, N-vinylpyrrole, N-vinylimidazole, N-vinylpyrazine, N-vinylmorpholine, N-vinylpyrazole, vinylpyridines, vinylpyrimidines, vinyloxazoles, vinylisoxazoles, vinylthiazoles, vinylisothiazoles, vinylpyridazines, (meth)acryloylpyrrolidones, (meth)acryloylpyrrolidines, (meth)acryloylpiperidines, and N-methylvinylpyrrolidones. Non-limiting examples of the imido-containing monomers include maleimide monomers such as N-cyclohexylmaleimide, N-isopropylmaleimide, N-laurylmaleimide, and N-phenyimaleimide; itaconimide monomers such as N-methylitaconimide, N-ethylitaconimide, N-butylitaconimide, N-octylitaconimide, N-2-ethylhexylitaconimide, N-laurylitaconimide, and N-cyclohexylitaconimide; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide. A non-limiting example of the isocyanate-containing monomers is 2-(meth)acryloyloxyethyl isocyanate.

The exemplary nitrogen-containing monomer may be selected typically from the cyclic N-vinylamides represented by Formula (1) and (meth)acrylamides, is preferably selected from the group consisting of N-vinyl-2-pyrrolidone, N-vinyl-2-caprolactam, N,N-dimethyl(meth)acrylamide, and N,N-diethyl(meth)acrylamide, and is more preferably N-vinyl-2-pyrrolidone.

The monomer components to constitute the acrylic polymer may contain the nitrogen-containing monomer or monomers in a content not limited, but preferably 0.5 mass percent or more, more preferably 1 mass percent or more, and furthermore preferably 2 mass percent or more, of the total amount (100 mass percent) of the monomer components. The content within the range preferred from the viewpoint of allowing the acrylic pressure-sensitive adhesive layer A to offer hardness, adhesiveness, and transparency all at sufficient levels. The content of the nitrogen-containing monomer or monomers is preferably 30 mass percent or less, more preferably 25 mass percent or less, and furthermore preferably 20 mass percent or less. The content within the range is preferred from the viewpoints of less causing the acrylic pressure-sensitive adhesive layer A to become excessively hard, of thereby allowing the same to offer satisfactory bonding reliability; and from the viewpoint of allowing the acrylic pressure-sensitive adhesive layer A to achieve high transparency.

Non-limiting examples of the other copolymerizable monomers include carboxy-containing monomers; epoxy-containing monomers; sulfonate-containing monomers such as sodium vinylsulfonate; phosphoric-containing monomers such as 2-hydroxyethylacryloyl phosphate; and isocyanate-containing monomers such as 2-methacryloyloxyethyl isocyanate. Non-limiting examples of the carboxy containing monomers include (meth)acrylic acid, itaconic acid, maleic acid, fumaric acid, crotonic acid, isocrotonic acid, and acid anhydrides of them, such as maleic anhydride and itaconic anhydride. Non-limiting examples of the epoxy-containing monomers include glycidyl (meth)acrylate and methylglycidyl (meth)acrylate Examples of the copolymerizable monomer also include, but are not limited to, (meth)acrylic alkoxyalkyl esters (alkoxyalkyl (meth)acrylates), alicyclic-hydrocarbon-group-containing (meth)acrylic esters, aromatic-hydrocarbon-group-containing (meth)acrylic esters, vinyl esters, and aromatic vinyl compounds. Non-limiting examples of the (meth)acrylic alkoxyalkyl esters include 2-methoxyethyl (meth)acrylate, 2-ethyoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate, and 4-ethoxybutyl (meth)acrylate. Non-limiting examples of the alicyclic-hydrocarbon-group-containing (meth)acrylic esters include cyclopentyl (meth)acrylate, cyclohexyl (meth)acrylate, and isobornyl (meth)acrylate. Non-limiting examples of the aromatic-hydrocarbon-group-containing (meth)acrylic esters include phenyl (meth)acrylate, phenoxyethyl (meth)acrylate, and benzyl (meth)acrylate. Non-limiting examples of the vinyl esters include vinyl acetate and vinyl propionate. Non-limiting examples of the aromatic vinyl compounds include styrene and vinyltoluene.

Examples of the copolymerizable monomer also include, but are not limited to, olefins or dienes such as ethylene, butadiene, isoprene, and isobutylene; vinyl ethers such as vinyl alkyl ethers; and vinyl chloride.

The acrylic polymer in the acrylic pressure-sensitive adhesive layer A is preferably derived from monomer components free from or substantially free from acidic-monomers, and is particularly preferably derived from monomer components devoid of or approximately devoid of carboxy-containing monomers. This is preferred from the viewpoint of allowing the acrylic pressure-sensitive adhesive layer A to effectively less or not cause corrosion. Specifically, from this viewpoint, the acrylic polymer in the acrylic pressure-sensitive adhesive layer A is preferably devoid of or approximately devoid of monomer units derived from acidic-group-containing monomers, in particular, those derived from carboxy-containing monomers. The configuration as above is preferred for restraining the acrylic pressure-sensitive adhesive layer A from chemically acting on an adherend and from adversely affecting the appearance and functions of the adherend with the pressure-sensitive adhesive sheet according to the present invention being disposed on the adherend. Non-limiting examples of the acidic-group-containing monomers include carboxy-containing monomers, sulfonate-containing monomers, and phosphoric-containing monomers. When the proportion of such acidic-group-containing monomers in the monomer components to constitute the acrylic polymer is 0.05 mass percent or less (preferably 0.01 mass percent or less) of the total amount (100 mass percent) of the monomer components, it can be said that the acrylic polymer is derived from monomer components substantially free from acidic-group-containing monomers.

The acrylic polymer as above can be prepared by polymerizing the monomer components. Non-limiting examples of polymerization techniques include solution polymerization, emulsion polymerization, bulk polymerization, and polymerization by irradiation with actinic radiation (actinic radiation polymerization). The polymerization is preferably performed via solution polymerzation. This is preferred from the viewpoint of allowing the acrylic pressure-sensitive adhesive layer A to achieve high transparency and high water resistance and from the viewpoint of reducing the production cost of the pressure-sensitive adhesive sheet according to the present invention. Namely, the acrylic polymer in the acrylic pressure-sensitive adhesive layer A is preferably obtained by polymerizing the monomer components via a solution polymerization technique.

A solvent for use in the solution polymerization may be selected from various organic solvents. Non-limiting examples of such organic solvents include esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. The solution polymerization may employ each of different solvents alone or in combination.

The acrylic polymer may have a weight-average molecular weight (Mw) not limited, but preferably $40 \times 10^4$ or more, and more preferably $60 \times 10^4$ or more, from the viewpoints of adhesive properties of the acrylic pressure-sensitive adhesive layer A before radiation curing, and the workability of the pressure-sensitive adhesive sheet according to the present invention. The acrylic polymer may have a weight-average molecular weight of preferably $200 \times 10^4$ or less, and more preferably $150 \times 10^4$ or less, from the viewpoint of the adhesiveness of the acrylic pressure-sensitive adhesive layer A. The weight-average molecular weight of the acrylic polymer can be controlled typically by the type and amount of the polymerization initiator, and the temperature, time, monomer concentrations, and monomer dropping rates in polymerization. As used herein, the term "weight-average molecular weight" refers to a value as measured by gel permeation chromatography (GPC) and calibrated with a polystyrene standard. Specifically, the weight-average molecular weight can be measured by a method described later relating to working examples.

The polymerization of the monomer components to give the acrylic polymer may employ a polymerization initiator. For example, the solution polymerization preferably employs a thermal initiator. The polymerization to give the acrylic polymer may employ each of different polymerization initiators alone or in combination.

The polymerization initiator for use in the solution polymerization is not limited, but is exemplified typically by azo initiators, peroxide polymerization initiators, and redox polymerization initiators. The azo initiators are preferably selected from the azo initiators disclosed in JP-A No. 2002-69411. The azo initiators are preferred for less causing decomposed products of such polymerization initiators to remain in the acrylic polymer, where the decomposed products may act as components causing, for example, gases (outgases) evolved upon heating. Non-limiting examples of such azo initiators include 2,2'-azobisisobutyronitrile (AIBN), 2,2'-azobis-2-methylbutyronitrile (AMBN), dimethyl 2,2'-azobis(2-methylpropionate), and 4,4'-azobis-4-cyanovaleric acid. Non-limiting examples of the peroxide polymerization initiators include dibenzoyl peroxide and tert-butyl permaleate. The amount of the polymerization initiator is not limited, as long as the polymerization initiator is usable as a polymerization initiator to give a desired molecular weight of the polymer and desired reactivity.

As described above, the acrylic pressure-sensitive adhesive layer A in the pressure-sensitive adhesive sheet according to the present invention includes not only the acrylic polymer, but also a multifunctional acrylic oligomer. The multifunctional acrylic oligomer is a compound including two or more constitutional repeating units and containing two or more (meth)acryloyl groups. Specifically, the multifunctional acrylic oligomer is a polymer containing two or more (meth)acryloyl groups per molecule. As used herein, the term "(meth)acryloyl group" refers to an "acryloyl group" and/or a "methacryloyl group", namely, refers to an "acryloyl group", or a "methacryloyl group", or both an "acryloyl group" and a "methacryloyl group". The acrylic pressure-sensitive adhesive layer A may include each of different multifunctional acrylic oligomers alone or in combination.

Non-limiting examples of the multifunctional acrylic oligomer include polyester (meth)acrylates each having a polyester skeleton added with two or more (meth)acryloyl groups as functional groups; epoxy (meth)acrylates each having an epoxy skeleton added with two or more (meth)acryloyl groups as functional groups; urethane (meth)acrylates each having a urethane skeleton added with two or more (meth)acryloyl groups as functional groups; and bisphenol-A ethylene oxide (EO) adduct diacrylates.

The polyester (meth)acrylates may be obtained typically by polymerizing a polyhydric alcohol and a polycarboxylic acid to give a polyester, and allowing (meth)acrylic acid to react with terminal hydroxy groups of the polyester. Specifically, the polyester (meth)acrylates are available typically as ARONIX M-6000, ARONIX M-7000, ARONIX M-8000, and ARONIX M-9000 from Toagosei Co. Ltd.

The epoxy (meth)acrylates may be obtained typically by allowing (math)acrylic acid to react with epoxy resins. Specifically, such epoxy (meth)acrylates are available as Ripoxy SP and Ripoxy VR from Showa Highpolymer Co., Ltd.; and EPDXY ESTER Series from Kyoeisha Chemical Co., Ltd.

The urethane (meth)acrylates may be obtained typically by allowing a polyol, an isocyanate, and a hydroxy(meth)acrylate to react with one another. The isocyanate may be selected from, but not limited to, aromatic isocyanates and aliphatic isocyanates, such as toluene diisocyanate, isophorone diisocyanate, and hexamethylene diisocyanate. The urethane (meth)acrylates may be available typically as Art Resin UN Series from Negami Chemical Industrial Co., Ltd.; NK Oligo U Series from Shin-Nakamura Chemical Co., Ltd.; and SHIKOH UV Series from Nippon Synthetic Chemical Industry Co., Ltd.

The number of (meth)acryloyl groups (number of functional groups) per molecule of the multifunctional acrylic oligomer is not limited, as long as being 2 or more, but is preferably 3 or more, and more preferably 5 or more. This is preferred from the viewpoint of compatibility between the bonding reliability of the acrylic pressure-sensitive adhesive layer A and the hardness of the acrylic pressure-sensitive adhesive layer A after curing. The number of (meth)acryloyl groups per molecule of the multifunctional acrylic oligomer is preferably 15 or less, and more preferably 12 or less. This is preferred from the viewpoint of allowing the acrylic pressure-sensitive adhesive layer A to offer satisfactory adhesiveness to an adhesend or adherends.

The multifunctional acrylic oligomer may have a weight-average molecular weight not limited, but preferably 400 or more, more preferably 500 or more, furthermore preferably 600 or more, and particularly preferably 700 or more. This is preferred from the viewpoints of allowing the pressure-sensitive adhesive sheet before curing of the acrylic pressure-sensitive adhesive layer A to surely have workability; less causing the acrylic pressure-sensitive adhesive layer A to have lower bonding reliability; and less causing the acrylic pressure-sensitive adhesive layer A to fail to have sufficient hardness even by irradiation. The multifunctional acrylic oligomer may have a weight-average molecular weight of preferably 10000 or less, more preferably 7000 or less, and furthermore preferably 5000 or less. This is preferred from the viewpoint of allowing the acrylic pressure-sensitive adhesive layer A, when cured by irradiation, to offer sufficient hardness. The weight-average molecular weight of the multifunctional oligomer may be determined typically by high-performance liquid chromatography (HPLC). For example, the weight-average molecular weight can be measured typically using HPLC 8020 supplied by TOSOH CORPORATION as an apparatus, two TSKgel GMH-H (20) columns coupled in series as columns, and tetrahydrofuran as a solvent, where the measurement is performed at a flow rate of 0.5 mL/min.

A homopolymer derived from the multifunctional acrylic oligomer may have a hardness not limited, but preferably 4B or more, more preferably HB or more, and furthermore preferably H or more. The hardness within the range is preferred from the viewpoint of allowing the acrylic pressure-sensitive adhesive layer A to have higher hardness. The acrylic pressure sensitive adhesive layer A preferably has sufficient hardness so as to offer sufficient force transmissibility. The hardness herein refers to a so-called pencil hardness and can be measured in conformity with the testing method for scratch hardness (pencil method) prescribed in JIS K 5600-5-4.

To allow the acrylic pressure-sensitive adhesive layer A after curing to achieve a low haze as mentioned below and, consequently, to offer high transparency, the difference in refractive index between the acrylic polymer and the multifunctional acrylic oligomer each for use in the acrylic pressure-sensitive adhesive layer A is preferably small. Specifically, the multifunctional acrylic oligomer for use herein is preferably one giving a homopolymer having a refractive index identical to or approximate to the refractive index of the acrylic polymer. The homopolymer of the multifunctional acrylic oligomer may have a refractive index not limited, but preferably 1.46 to 1.54, more preferably 1.47 to 1.52, and furthermore preferably 1.47 to 1.51. The refractive index can be determined by a measurement in conformity with JIS K 0062 (1992) using an Abbe refractometer and a sodium D line (at a wavelength of 589 nm).

In the pressure-sensitive adhesive sheet according to the present invention, the acrylic pressure-sensitive adhesive layer A may contain the multifunctional acrylic oligomer in a content not limited, but preferably 0.05 part by mass or more, more preferably 3 parts by mass or more, and furthermore preferably 5 parts by mass or more, per 100 parts by mass of the acrylic polymer in the acrylic pressure-sensitive adhesive layer A. This is preferred from the viewpoints of allowing the acrylic pressure-sensitive adhesive layer A to offer sufficient adhesiveness; and allowing the acrylic pressure-sensitive adhesive layer A to have sufficient hardness by irradiation. The acrylic pressure-sensitive adhesive layer A may contain the multifunctional acrylic oligomer in a content of preferably 40 parts by mass or less, more preferably 35 parts by mass or less, and furthermore preferably 30 parts by mass or less, per 100 parts by mass of the acrylic polymer in the acrylic pressure-sensitive adhesive layer A. This is preferred from the viewpoint of less causing the acrylic pressure-sensitive adhesive layer A to have lower bonding reliability; and from the viewpoint of handleability of the pressure-sensitive adhesive sheet according to the present invention.

The acrylic pressure-sensitive adhesive layer A in the pressure-sensitive adhesive sheet according to the present invention may contain one or more basic monomers as polymerizable monomers. The term "basic monomer" as used herein refers to a monomer having basicity. The "basicity" refers to such a property that a substance in question has a high acid dissociation constant pKa, or a low base dissociation constant pKb. Namely, the acrylic pressure-sensitive adhesive layer A preferably contains a monomer having high basicity. The basic monomer as mentioned above preferably contains at least one of amido group and amino group per molecule. Assume that the acrylic pressure-sensitive adhesive layer A in the pressure-sensitive adhesive sheet according to the present invention contains one or more basic monomers. This configuration is advantageous for allowing the acrylic pressure-sensitive adhesive layer A after curing to have sufficient hardness and to offer satisfactory adhesiveness. This is because such basic monomers undergo polymerization reactions upon irradiation and are cured with increasing hardness, the acrylic pressure-sensitive adhesive layer A offers better force transmissibility.

The basic monomers are preferably selected from materials that have a high boiling point and are not volatilized at a drying temperature in the preparation of the pressure-sensitive adhesive sheet. Specifically, the basic monomers may have a boiling point of preferably 120° C. or higher, and more preferably 130° C. or higher, at normal atmospheric pressure. Non-limiting examples of the basic monomers include dimethylaminopropylmethacrylamide (DMAPMA) (having a boiling point of 134° C. (2 mmHg) and a pKa of 9.30) and dimethylaminopropylacrylamide (DMAPAA) (having a boiling point of 117° C. (2 mmHg) and a pKa of 10.35). The basic monomer for use herein preferably includes dimethylaminopropylmethacrylamide (DMAPMA). This is preferred from the viewpoint of allowing the acrylic pressure-sensitive adhesive layer A to achieve high adhesiveness. The acrylic pressure-sensitive adhesive layer A may contain each of different basic monomers alone or in combination.

The acrylic pressure-sensitive adhesive layer A in the pressure-sensitive adhesive sheet according to the present invention may contain the basic monomer or monomers in a content not limited, but preferably 0.5 part by mass or more, and more preferably 1 part by Mass or more, per 100 parts by mass of the acrylic polymer. This is preferred from the viewpoint of allowing the acrylic pressure-sensitive adhesive layer A to readily offer hardness and strong adhesiveness. The acrylic pressure-sensitive adhesive layer A may contain the basic monomer or monomers in a content of preferably 20 parts by mass or less, and more preferably 15 parts by mass or less, per 100 parts by mass of the acrylic polymer. This is preferred from the viewpoint of less causing the acrylic pressure-sensitive adhesive layer A to have lower bonding reliability.

The acrylic pressure-sensitive adhesive layer A in the pressure-sensitive adhesive sheet according to the present invention may contain one or more photoinitiators. The acrylic pressure-sensitive adhesive layer A, when containing a photoinitiator, can be more readily cured by irradiation. For example, the acrylic pressure-sensitive adhesive layer A can be more readily cured (namely, polymerized by the action of radiation) typically by applying the pressure-sensitive adhesive sheet according to the present invention to an adherend or adherends and irradiating the sheet with radiation such as electron beams and ultraviolet rays. When the radiation polymerization is performed via electron beam irradiation, the acrylic pressure-sensitive adhesive layer A does not particularly have to contain a photoinitiator. However, when the radiation polymerization is performed via ultraviolet irradiation, the acrylic pressure-sensitive adhesive layer A preferably contains a photoinitiator. The acrylic pressure-sensitive adhesive layer A may contain each of different photoinitiators alone or in combination.

Examples of the photoinitiators include, but are not limited to, benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, thioxanthone photoinitiators, and acylphosphine oxide photoinitiators.

Non-limiting examples of the benzoin ether photoinitiators include benzoin methyl ether, benzoin ethyl ether, benzoin propyl ether, benzoin isopropyl ether, benzoin isobutyl ether, and 2,2-dimethoxy-1,2-diphenylethan-1-one (for example, trade name Irgacure 651, supplied by BASF SE). Non-limiting examples of the acetophenone photoinitiators include 1-hydroxycyclohexyl phenyl ketone (for example, trade name Irgacure 184, supplied by BASF SE), 4-phenoxydichloroacetophenone, 4-t-butyl-dichloroacetophenone, 1-[4-(2-hydroxyethoxy)-phenyl]-2-hydroxy-2-methyl-1-propan-1-one (for example, trade name Irgacure 2959, supplied by BASF SE), 2-hydroxy-2-methyl-1-phenyl-propan-1-one (for example, trade name DAROCUR 1173, supplied by BASF SE), and methoxyacetophenone. Non-limiting examples of the α-ketol photoinitiators include 2-methyl-2-hydroxypropiophenone and 1-[4-(2-hydroxyethyl)-phenyl]-2-hydroxy-2-methylpropan-1-one. A non-limiting example of the aromatic sulfonyl chloride photoinitiators is 2-naphthalenesulfonyl chloride. A non-limiting example of the photoactive oxime photoinitiators is 1-phenyl-1,2-propanedione-2-(O-ethoxycarbonyl) oxime.

A non-limiting example of the benzoin photoinitiators is benzoin. A non-limiting example of the benzil photoinitiators is benzil. Non-limiting examples of the benzophenone photoinitiators include benzophenone, benzoylbenzoic acid, 3,3=-dimethyl-4-methoxybenzophenone, polyvinylbenzophenones, and α-hydroxycyclohexyl phenyl ketone. A non-limiting example of the ketal photoinitiators is benzil dimethyl ketal. Non-limiting examples of the thioxanthone photoinitiators include thioxanthone, 2-chlorothioxanthone, 2-methylthioxanthone, 2,4-dimethylthioxanthone, isopropylthioxanthones, 2,4-dichlorothiaxanthone, 2,4-diethylthioxanthone, isopropylthioxanthones, 2,4-diisopropylthioxanthone, and dodecyl thioxanthone.

Non-limiting examples of the acylphosphine photoinitiators include bis(2,6-dimethoxybenzyl)phenylphosphine oxide, bis (2,6-dimethoxybenzoyl) (2,4,4-trimethylpentyl) phosphine oxide, bis(2,6-dimethoxybenzoyl)-n-butylphosphine oxide, bis(2,6-dimethoxybenzoyl)-(2-methylprop-1-yl)phosphine oxide, bis (2,6-dimethoxybenzoyl)-(1-methylprop-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl) (2-methylprop-1-yl)phosphine oxide, bis (2-methoxybenzoyl) (1-methylprop-1-yl)phosphine oxide, bis(2,6-diethoxybenzoyl) (2-methylprop-1-yl)phosphine oxide, bis(2,6-diethoxybenzoyl) (1-methylprop-1-yl)phosphine oxide, bis(2,6-dibutoxybenzoyl) (2-methylprop-1-yl) phosphine oxide, bis(2,4-dimethoxybenzoyl) (2-methylprop-1-yl)phosphine oxide, bis(2,4,6-trimethylbenzoyl) (2,4-dimethoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoylbenzylbutylphosphine oxide, 2,6-dimethoxybenzoylbenzylbutylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyldiphenylphosphine oxide (for example, trade name Irgacure 819, supplied by BASE SE), bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl) phosphine oxide]decane, and tri(2-methylbenzoyl)phosphine oxide.

The acrylic pressure-sensitive adhesive layer A in the pressure-sensitive adhesive sheet according to the present invention may contain a photoinitiator or photoinitiators in a content not limited, but preferably 0.05 part by mass or more, more preferably 0.1 part by mass or more, and furthermore preferably 0.2 part by mass or more, per 100 parts by mass of the acrylic polymer. This is preferred from the viewpoint of allowing the acrylic pressure-sensitive adhesive layer A to enjoy sufficient effects obtained by containing the photoinitiators (the effects of allowing the acrylic pressure-sensitive adhesive layer A to be more readily cured by irradiation). In contrast, the acrylic pressure-sensitive adhesive layer A may contain the photoinitiator or photoinitiators in a content of preferably 5 parts by mass or less, more preferably 3 parts by mass or less, and furthermore preferably 1.5 parts by mass or less, per 100 parts by mass of the acrylic polymer. This is preferred from the viewpoint of restraining the photoinitiator from excessively absorbing radiation upon irradiation of the acrylic pressure-sensitive adhesive layer A and from impeding sufficient curing of the acrylic pressure-sensitive adhesive layer A.

In the pressure-sensitive adhesive sheet according to the present invention, the acrylic pressure-sensitive adhesive layer A, or a pressure-sensitive adhesive composition for the formation of the acrylic pressure-sensitive adhesive layer A may contain one or more crosslinkers. The presence of the crosslinker or crosslinkers is advantageous for imparting cohesive force to the acrylic pressure-sensitive adhesive layer A before radiation curing and contributes to satisfactory workability in the pressure-sensitive adhesive sheet, and to satisfactory adhesiveness in the acrylic pressure-sensitive adhesive layer A. The acrylic pressure-sensitive adhesive layer A or the pressure-sensitive adhesive composition for the formation thereof may contain each of different crosslinkers alone or in combination.

Examples of the crosslinkers include, but are not limited to, isocyanate crosslinkers, epoxy crosslinkers, melamine crosslinkers, peroxide crosslinkers, urea crosslinkers, metal alkoxide crosslinkers, metal chelate crosslinkers, metal salt crosslinkers, carbodiimide crosslinkers, oxazoline crosslinkers, aziridine crosslinkers, and amine crosslinkers.

Examples of the isocyanate crosslinkers (multifunctional isocyanate compounds) include, but are not limited to, lower aliphatic polyisocyanates, alicyclic polyisocyanates, and aromatic polyisocyanates. Non-limiting examples of the lower aliphatic polyisocyanates include 1,2-ethylene diisocyanate, 1,4-butylene diisocyanate, and 1,6-hexamethylene diisocyanate. Non-limiting examples of the alicyclic polyisocyanates include cyclopentylene diisocyanate, cyclohexylene diisocyanate, isophorone diisocyanate, hydrogenated tolylene diisocyanates, and hydrogenated xylene diisocyanates. Non-limiting examples of the aromatic polyisocyanates include 2,4-tolylene diisocyanate, 2,6-tolylene diisocyanate, 4,4'-diphenylmethane diisocyanate, and xylylene diisocyanates. Such isocyanate crosslinkers may also be available as commercial products which are exemplified typically by trimethylolpropane/tolylene diisocyanate adduct (for example, trade name CORONATE L, supplied by Nippon Polyurethane Industry Co., Ltd.), a trimethylolpropane/hexamethylene diisocyanate adduct (for example, trade name CORONATE HL, supplied by TOSOH CORPORATION, formerly known as Nippon Polyurethane Industry Co., Ltd.), a trimethylolpropane/xylylene diisocyanate adduct (for example, trade name TAKENATE 110N, supplied by Mitsui Chemicals Inc.), and hexamethylene diisocyanate crosslinkers (HDI crosslinkers) (for example, trade name DURANATE, supplied by Asahi Kasei Chemicals Corporation).

Non-limiting examples of the epoxy crosslinkers (multifunctional epoxides) include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, diglycidyl adipate, diglycidyl o-phthalate, triglycidyl tris(2-hydroxyethyl) isocyanurate, resorcinol diglycidyl ether, and bisphenol-S diglycidyl ether; as well as epoxy resins containing two or more epoxy groups per molecule. Such epoxy crosslinkers are also commercially available typically as TETRAD C from MITSUBISHI GAS CHEMICAL COMPANY, INC.

The acrylic pressure-sensitive adhesive layer A or the pressure-sensitive adhesive composition for the formation thereof may contain the crosslinker or crosslinkers in a content not limited, but preferably in such a content that the acrylic pressure-sensitive adhesive layer A before curing by irradiation has a gel fraction of 10% (in mass percent) or more. The acrylic pressure-sensitive adhesive layer A before curing, when having a gel fraction of 10% or more, tends to have sufficient cohesive force to allow the pressure-sensitive adhesive sheet to readily offer satisfactory workability. In addition, this acrylic pressure-sensitive adhesive layer A readily offers satisfactory adhesiveness. Specifically, the content of the crosslinker or crosslinkers may be set according typically to the molecular weight of the acrylic polymer, the formula of the monomer components to constitute the acrylic polymer, and the type of the crosslinker. The content is typically 0.05 to 5 parts by mass, and preferably 0.1 to 3 parts by mass, per 100 parts by mass of the acrylic polymer.

The acrylic pressure-sensitive adhesive layer A in the pressure-sensitive adhesive sheet according to the present invention may contain one or more tackifier resins (tackifiers). Assume that the acrylic pressure-sensitive adhesive layer A contains one or more tackifier resins. This configuration is advantageous for allowing the acrylic pressure-sensitive adhesive layer A to achieve satisfactory adhesiveness. Examples of the tackifier resins include, but are not limited to, rosin derivatives, polyterpene resins, petroleum resins, and oil-soluble phenol resins. The acrylic pressure-sensitive adhesive layer A may contain each of different tackifier resins alone or in combination.

The acrylic pressure-sensitive adhesive layer A may contain the tackifier resin or resins in a content not limited, but typically preferably 1 to 20 parts by mass, and more preferably 1 to 10 parts by mass, per 100 parts by mass of the acrylic polymer.

The acrylic pressure-sensitive adhesive layer A in the pressure-sensitive adhesive sheet according to the present invention may contain one or more silane coupling agents. Assume that the acrylic pressure-sensitive adhesive layer A contains one or more silane coupling agents. When the pressure-sensitive adhesive sheet according to the present invention is applied to a hydrophilic adherend such as glass, the configuration just mentioned above is advantageous for allowing the acrylic pressure-sensitive adhesive layer A to achieve satisfactory water resistance at an interface with the adherend. The acrylic pressure-sensitive adhesive layer A may contain each of different silane coupling agents alone or in combination.

Examples of the silane coupling agents include, but are not limited to, epoxy-containing silane coupling agents, amino-containing silane coupling agents, (meth)acryl-containing silane coupling agents, and isocyanate-containing silane coupling agents. Non-limiting examples of the epoxy-containing silane coupling agents include 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane examples of the amino-containing silane coupling agents include 3-aminopropyltrimethoxysilane, N-2-(aminoethyl)-3-aminopropylmethyldimethoxysilane, 3-triethylsilyl-N-(1,3-dimethylbutylidene)propylamine, and N-phenyl-γ-aminopropyltrimethoxysilane. Non-limiting examples of the (meth)acryl-containing silane coupling agents include 3-acryloxypopyltrimethoxysilane and 3-methacryloxypropyltriethoxysilane. A non-limiting example of the isocyanate-containing silane coupling agents is 3-isocyanatopropyltriethoxysilane.

The acrylic pressure-sensitive adhesive layer A may contain the silane coupling agent or agents in a content not limited, but preferably 0.01 part by mass or more, and more preferably 0.02 part by mass or more, per 100 parts by mass of the acrylic polymer. This is preferred from the viewpoint of less causing the acrylic pressure-sensitive adhesive layer A to have lower durability. In contrast, the acrylic pressure-sensitive adhesive layer A may contain the silane coupling agent or agents in a content of preferably 1 part by mass or less, and more preferably 0.6 part by mass or less, from the viewpoint of less causing the acrylic pressure-sensitive adhesive layer A to have excessively high cohesive force and to have lower adhesiveness.

The acrylic pressure-sensitive adhesive layer A in the pressure-sensitive adhesive sheet according to the present invention may contain one or more other additives within ranges not adversely affecting the advantageous effects of the present invention. Non-limiting examples of the additives which the acrylic pressure-sensitive adhesive layer A may contain include colorants, pigments and other powders, dyes, surfactants, plasticizers, surface lubricants, leveling agents, softeners, antioxidants, age inhibitors, photostabilizers, polymerization inhibitors, inorganic or organic fillers, metal powders, granular or particulate substances, and foil-like substances. The contents of these additives may be determined as appropriate within ranges not adversely affecting the advantageous effects of the present invention, and are typically 10 parts by mass or less per 100 parts by mass of the acrylic polymer.

The acrylic pressure-sensitive adhesive layer A in the pressure-sensitive adhesive sheet according to the present invention may be derived from (formed from) a pressure-sensitive adhesive composition. For example, assume that the acrylic pressure-sensitive adhesive layer A is derived from a solvent-borne pressure-sensitive adhesive composition. In this case, the acrylic pressure-sensitive adhesive layer A can be formed typically by applying the pressure-sensitive adhesive composition onto a base material (such as a substrate or a separator (release liner)) to form a coat layer (pressure-sensitive adhesive composition layer), and heating and drying the coat layer to remove, for example, a polymerization solvent. Upon the application of the pressure-sensitive adhesive composition, one or more solvents other than the polymerization solvent may be added as appropriate to the composition.

The application (coating) of the pressure-sensitive adhesive composition, when being a radiation-curable composition, may be performed by any of various coating techniques. The application may be performed using a coating device. Non-limiting examples of the coating or application techniques include comma coating, roll coating, kiss-contact roll coating, gravure coating, reverse coating, roll brushing, spray coating, dip roll coating, bar coating, knife coating, air-knife coating, curtain coating, lip coating, and extrusion coating typically using a die coater.

Assume that the acrylic pressure-sensitive adhesive layer A is formed from a solvent-borne pressure-sensitive adhesive composition. In this case, the temperature and time of the heating-drying of the pressure-sensitive adhesive composition layer are not limited. However, the heating-drying temperature is preferably selected within the range of 50° C. to 120° C. from the viewpoint of allowing the formed acrylic pressure-sensitive adhesive layer A to have excellent adhesive properties. The heating-drying time is preferably 5 seconds to 20 minutes, more preferably 5 seconds to 10 minutes, and furthermore preferably 10 seconds to 5 minutes.

The acrylic pressure-sensitive adhesive layer A in the pressure-sensitive adhesive sheet according to the present invention may have a thickness not limited, but preferably 1 to 300 μm, more preferably 5 to 200 μm, furthermore preferably 7 to 100 μm, and particularly preferably 10 to 80 μm.

In the pressure-sensitive adhesive sheet according to the present invention, the acrylic pressure-sensitive adhesive layer A after curing has a Young's modulus of 500 kPa or more, preferably 700 kPa or more, and more preferably 1000 kPa or more, at 23° C. This configuration is advantageous for allowing not only the acrylic pressure-sensitive adhesive layer A, but also the pressure-sensitive adhesive sheet according to the embodiment, to achieve satisfactory force transmissibility. The acrylic pressure-sensitive adhesive layer A after curing has a Young's modulus of 10000 kPa or less, and preferably 7000 kPa or less, at 23° C. This configuration is advantageous for less causing the acrylic pressure-sensitive adhesive layer A to become excessively hard and to offer lower bonding reliability.

In the pressure-sensitive adhesive sheet according to the present invention, the acrylic pressure-sensitive adhesive layer A after curing has an adhesive strength of 3.0 N/20 mm or more, preferably 4.0 N/20 mm or more, and more preferably 6.0 N/20 mm or more. This configuration is advantageous for allowing the acrylic pressure-sensitive adhesive layer A and the pressure-sensitive adhesive sheet according to the embodiment to achieve satisfactory adhesiveness. In contrast, the acrylic pressure-sensitive adhesive layer A after curing may have an adhesive strength of preferably 30 N/20 mm or less, and more preferably 25 N/20 ram or less. In the embodiment, the term. "adhesive strength" of the acrylic pressure-sensitive adhesive layer A after curing refers to an adhesive strength determined with respect to, as an adherend, a stainless steel (steel-use stainless (SUS) 304) plate or a polycarbonate resin plate (PC plate).

The adhesive strength of the acrylic pressure-sensitive adhesive layer A may be determined in conformity with JIS Z 0237 and is defined in the following manner. The acrylic pressure-sensitive adhesive layer A is applied to the adherend, bonded thereto via compression bonding, and then peeled off from the adherend at a peel angle (tensile angle) of 180° and a tensile speed of 300 mm/minutes. Force required to peel the acrylic pressure-sensitive adhesive layer A from the adherend is defined as the adhesive strength.

In the pressure-sensitive adhesive sheet according to the present invention, the acrylic pressure-sensitive adhesive layer A before curing may have a Young's modulus at 23° C. not limited, but preferably 30 kPa or more, more preferably 50 kPa or more, and furthermore preferably 70 kPa or more. This is preferred from the viewpoints of allowing the resulting pressure-sensitive adhesive sheet to have satisfactory handle ability and workability; and allowing the pressure-sensitive adhesive sheet to offer satisfactory force transmissibility in contrast, the acrylic pressure-sensitive adhesive layer A before curing has a Young's modulus at 23° C. of preferably 200 kPa or less, and more preferably 150 kPa or less. This is preferred from the viewpoint of less causing the acrylic pressure-sensitive adhesive layer A to become excessively hard and to have lower bonding reliability.

In the pressure-sensitive adhesive sheet according to the present invention, the acrylic pressure-sensitive adhesive layer A before curing may have an adhesive strength not limited, but preferably 3.0 N/20 mm or more, more preferably 5.0 N/20 mm or more, and furthermore preferably 10.0 N/20 mm or more, from the viewpoints of stability (fixability) to the adherend, such as the viewpoint of allowing the pressure-sensitive adhesive sheet according to the embodiment to offer satisfactory temporary fixability during a period from the application of the pressure-sensitive adhesive sheet to the adherend to the curing of the acrylic pressure-sensitive adhesive layer A. In contrast, the acrylic pressure-sensitive adhesive layer A before curing may have an adhesive strength of preferably 30 N/20 mm or less, and more preferably 25 N/20 mm or less. In the embodiment, the term "adhesive strength" of the acrylic pressure-sensitive adhesive layer A before curing refers to an adhesive strength determined when a stainless steel plate (SUS304) or a polycarbonate resin plate (PC plate) is employed as the adherend.

The acrylic pressure-sensitive adhesive layer A in the pressure-sensitive adhesive sheet according to the present invention may have a haze not limited, but preferably 10% or less, and more preferably 5% or less, from the viewpoint of allowing the pressure-sensitive adhesive sheet to have satisfactory transparency. Specifically, the acrylic pressure-sensitive adhesive layer A before curing may have a haze of preferably 10% or less, and more preferably 5% or less. The acrylic pressure-sensitive adhesive layer A after curing may have a haze of preferably 10% or less, and more preferably 5% or less. The haze may be determined in conformity with JIS K 7136:2000.

In the pressure-sensitive adhesive sheet according to the present invention, the acrylic pressure-sensitive adhesive layer A after curing may have a gel fraction not limited, but preferably 70% (in mass percent) or more, more preferably 75% or more, and furthermore preferably 80% or more, from the viewpoint of compatibility between adhesiveness and force transmissibility in the acrylic pressure-sensitive adhesive layer A.

In the pressure-sensitive adhesive sheet according to the present invention, the acrylic pressure-sensitive adhesive layer A before curing may have a gel fraction not limited, but preferably 1% or more, more preferably 30% or more, and furthermore preferably 50% or more. This is preferred from the viewpoints of allowing the resulting pressure-sensitive adhesive sheet to offer satisfactory workability; and allowing the pressure-sensitive adhesive sheet to have satisfactory adhesiveness.

The gel fraction of the pressure-sensitive adhesive layer may be determined typically in the following manner. Initially, a sample is collected from the pressure-sensitive adhesive layer and weighed. The measured weight is defined as "W1". Next, the sample is wrapped with a tetrafluoroethylene resin porous membrane into a pouch, and the opening of which is tied with a kite string and yields a package. Next, the package is immersed in ethyl acetate and left stand at room temperature (typically 23° C.) for 7 days. Next, the package is recovered from ethyl acetate, and the recovered package is dried at 130° C. for 2 hours. After drying, the package is weighed, and the weight of the sample is determined by subtracting the tetrafluoroethylene resin porous membrane weight and the kite string weigh from the package weight. The determined sample weight is defined as "W2". On the basis of these, the gel fraction is determined according to the following expression:

Gel fraction (in mass percent)=($W2$)/($W1$)×100

Substrate

The pressure-sensitive adhesive sheet according to the present invention may be a substrate-supported pressure-sensitive adhesive sheet, as described above. Specifically, the pressure-sensitive adhesive sheet according to the present invention may include a substrate (base material, backing) in addition to the acrylic pressure-sensitive adhesive layer A. The substrate may have a single-layer structure or a multilayer structure.

Non-limiting examples of the substrate include plastic films, substrates made of porous materials, nets, rubber sheets, foamed sheets (sheet foams), and metallic foils; as well as laminates of these materials. Examples of the plastic films include, but are not limited to, polyolefin films, polyester films, vinyl chloride resin films, vinyl acetate resin films, polyimide resin films, polyimide resin films, fluorocarbon resin films, and cellophanes. Non-limiting examples of the polyolefin films include polyethylene films, polypropylene films, and ethylene-propylene copolymer films. Non-limiting examples of the polyester films include polyethylene terephthalate) films. The plastic films may be any of non-oriented (non-stretched) films and oriented films (uniaxially oriented films and biaxially oriented. Non-limiting examples of the porous materials constituting the porous material substrates include paper such as Japanese paper, kraft paper, glassine paper, woodfree paper, synthetic paper, and top coated paper; and fabrics such as woven fabrics and nonwoven fabrics. Non-limiting examples of fiber materials constituting the fabrics include natural fibers, semi-synthetic fibers, and synthetic fibers, such as cotton fibers, staple fibers, Manila hemp fibers, pulp, rayon, acetate fibers, polyester fibers, poly(vinyl alcohol) fibers, polyamide fibers, and polyolefin fibers. Non-limiting examples of rubber constituting the rubber sheets include natural rubber and isobutylene-isoprene rubber. Non-limiting examples of the foams constituting the sheet foams include polyurethane foams and polychloroprene rubber foams. Non-limiting examples of the metallic foils include aluminum foil and copper foil.

The substrate may include one or more of various additives as needed. Non-limiting examples of such additives include fillers (such as inorganic fillers and organic fillers), age inhibitors, antioxidants, ultraviolet absorbers, lubricants, plasticizers, and colorants (such as pigments and dyes). The substrate may have undergone a surface treatment on its surface. Non-limiting examples of the surface treatment include physical treatments such as corona treatment and plasma treatment; and chemical treatments such as primer coating and backing.

The substrate may have a thickness not limited, but typically 1 to 200 μm, and preferably 10 to 100 μm.

Other Pressure-Sensitive Adhesive Layer

The pressure-sensitive adhesive sheet according to the present invention may have another pressure-sensitive adhesive layer (a pressure-sensitive adhesive layer other than the acrylic pressure-sensitive adhesive layer A), within ranges not adversely affecting the advantageous effects of the present invention. Non-limiting examples of the other pressure-sensitive adhesive layer include pressure-sensitive adhesive layers formed from or including pressure-sensitive adhesives such as urethane pressure-sensitive adhesives, acrylic pressure-sensitive adhesives, rubber pressure-sensitive adhesives, silicone pressure-sensitive adhesives, polyester pressure-sensitive adhesives, polyamide pressure-sensitive adhesives, epoxy pressure-sensitive adhesives, vinyl alkyl ether pressure-sensitive adhesives, and fluorine-containing pressure-sensitive adhesives. The other pressure-sensitive adhesive layer may be formed from or include each of different pressure-sensitive adhesives alone or in combination as a mixture.

Separator

The pressure-sensitive adhesive sheet according to the present invention may bear a separator (release liner) on its adhesive face before use. The separator is a member that protects a pressure-sensitive adhesive layer of a pressure-sensitive adhesive sheet from being exposed. The separator is removed from the pressure-sensitive adhesive sheet when the pressure-sensitive adhesive sheet is applied to an adherend. The separator to protect the pressure-sensitive adhesive sheet may be in any form not limited. For example, assume that the pressure-sensitive adhesive sheet according to the present invention is a double-sided pressure-sensitive adhesive sheet. This pressure-sensitive adhesive sheet may be typically in such a form that the pressure-sensitive adhesive sheet is held between two separators, or in such a form that the pressure-sensitive adhesive sheet with a separator is wound into a roll so that the pressure-sensitive adhesive sheet and the separator are present alternately.

Examples of the separator include, but are not limited to, base materials each having a release coat layer; low-adhesive base materials made of fluorocarbon polymers; and low-adhesive base materials made of nonpolar polymers. Non-limiting examples of the base materials having a release coat layer include plastic films and paper, each of which have undergone a surface treatment with a release treatment agent (release agent). Examples of the release agent include silicones, long-chain alkyls, fluorocarbons, molybdenum sulfide, and any other release treatment agents. Non-limiting examples of the plastic films are as with the plastic films described above relating to the substrate. Non-limiting examples of the fluorocarbon polymers include polytetrafluoroethylenes, polychlorotrifluoroethylenes, poly(vinyl fluoride)s, poly(vinylidene fluoride)s, tetrafluoroethylene-hexafluoropropylene copolymers, and chiorofluoroethylene-vinylidene fluoride copolymers. Non-limiting examples of the nonpolar polymers include olefinic resins such as polyethylenes and polypropylenes.

The separator surface may have undergone any of a surface release treatment, an antifouling treatment, and an antistatic treatment. The surface release treatment may be performed using a release agent or silica powder, where the release agent is exemplified typically by silicone-, fluorine-, long-chain alkyl-, and fatty acid amide-release agents. The surface release treatment allows the separator to have better removability from the pressure-sensitive adhesive layer. The antifouling treatment may be performed using a silica powder. The antistatic treatment may be performed as an antistatic treatment via coating, kneading, or vapor deposition.

The separator may have a thickness not limited, but typically 5 to 200 μm, and preferably 5 to 100 μm. The "thickness of the separator" herein is not included in the thickness of the pressure sensitive adhesive sheet according to the present invention.

Pressure-Sensitive Adhesive Sheet

The pressure-sensitive adhesive sheet according to the present invention includes the acrylic pressure-sensitive adhesive layer A having the configuration as mentioned above. Consequently, the pressure-sensitive adhesive sheet according to the present invention has satisfactory adhesive force, still less causes the relaxation and attenuation of external force when receiving the force, and is suitable for efficiently transmitting the force and is suitable for achieving both adhesiveness and force transmissibility.

The pressure-sensitive adhesive sheet according to the present invention may be prepared typically in the following manner. Assume that the pressure-sensitive adhesive sheet is a transfer pressure-sensitive adhesive sheet including the acrylic pressure-sensitive adhesive layer A alone. This pressure-sensitive adhesive sheet may be prepared typically by applying a pressure-sensitive adhesive composition onto a separator, drying the applied composition to form an acrylic pressure-sensitive adhesive layer A, and providing a separator on the acrylic pressure-sensitive adhesive layer A. Assume that the pressure-sensitive adhesive sheet is a single-sided pressure-sensitive adhesive sheet including a substrate, and an acrylic pressure-sensitive adhesive layer A disposed on one side of the substrate. This pressure-sensitive adhesive sheet may be prepared typically by applying a pressure-sensitive adhesive composition to one side of the substrate, and drying the applied composition to form the acrylic pressure-sensitive adhesive layer A. Such single-sided pressure-sensitive adhesive sheet including a substrate and the acrylic pressure-sensitive adhesive layer A on one side of the substrate may also be prepared by forming the acrylic pressure-sensitive adhesive layer A on a separator, and transferring the acrylic pressure-sensitive adhesive layer A to the substrate.

The pressure-sensitive adhesive sheet according to the present invention may have a thickness not limited, but preferably 5 to 300 μm, more preferably 8 to 150 μm, and furthermore preferably 10 to 100 μm.

The pressure-sensitive adhesive sheet according to the present invention may have a haze not limited, but preferably 10% or less, and more preferably 5% or less. The pressure-sensitive adhesive sheet according to the embodiment, when having this configuration, has excellent transparency and, when applied and disposed on an adherend, allows the adherend surface to be seen satisfactorily through the pressure-sensitive adhesive sheet.

The pressure-sensitive adhesive sheet according to the present invention includes the acrylic pressure-sensitive adhesive layer A having the configurations as mentioned above, thereby has satisfactory adhesive force, and, less causes the relaxation and attenuation of external force when receiving the force, and is suitable for efficiently transmitting the force. The pressure-sensitive adhesive sheet according to the present invention as mentioned above is advantageously usable as a pressure-sensitive adhesive sheet for coupling and/or securing parts/components. This is because these uses may require efficient transmission of force acting on one part/component via the pressure-sensitive adhesive sheet to another part/component. The pressure-sensitive adhesive sheet according to the present invention is also advantageously usable as a pressure-sensitive adhesive sheet for the surface protection of touch screens. This is because such pressure-sensitive adhesive sheet for the surface protection of touch screens may require efficient transmission of force to the screen from the viewpoint of response sensitivity to a touch operation to the screen. In addition, the pressure-sensitive adhesive sheet according to the present invention is advantageously usable as a pressure-sensitive adhesive sheet for use in electronic devices such as sensors. This is because such pressure-sensitive adhesive sheet for use in electronic devices such as sensors may require efficient transmission of force which acts on the pressure-sensitive adhesive sheet from the viewpoint of not interfering with sensing by sensors.

EXAMPLES

The present invention will be illustrated in further detail with reference to several examples (working examples)

below. It should be noted, however, that the examples are by no means intended to limit the scope of the present invention.

Acrylic Polymer Solution Preparation Example 1

In a four-neck flask equipped with stirring blades, a thermometer, a nitrogen gas inlet tube, and a condenser, were placed 63 parts by mass of 2-ethylhexyl acrylate (2EHA), 15 parts by mass of N-vinylpyrrolidone (NVP), 9 parts by mass of methyl methacrylate (MMA), 13 parts by mass of 2-hydroxyethyl acrylate (HEA), and 0.2 part by mass of 2,2'-azobisisobutyronitrile (AIBN) as a thermal initiator, together with 177.8 parts by mass of ethyl acetate as a polymerization solvent. The solution in the flask was stirred at 23° C. in a nitrogen atmosphere for 2 hours, reacted at 65° C. for 5 hours, and subsequently further reacted at 70° C. for 2 hours. This gave a polymer solution containing a polymer (prepared pressure-sensitive adhesive solution). This polymer solution was defined as "polymer solution (A)". The polymer in the polymer solution (A) had a solids concentration of 36.0% (in mass percent) and a weight-average molecular weight of $85 \times 10^4$.

Acrylic Polymer Solution Preparation Example 2

In a four-neck flask equipped with stirring blades, a thermometer, a nitrogen gas inlet tube, and a condenser, were placed 2.9 parts by mass of acrylic acid (AA), 5 parts by mass of vinyl acetate CVAc), 92 parts by mass of butyl acrylate (BA), and 0.1 part by mass of hydroxyethyl acrylate (HEA), together with 30 parts by mass of ethyl acetate and 120 parts by mass of toluene both as polymerization solvents. Next, the solution in the flask was stirred for 2 hours with nitrogen gas being introduced After removing oxygen from the polymerization system in this manner, the solution in the flask was combined with 0.2 part by mass of 2,2'-azobisisobutyronitrile (AIBN) as a thermal initiator, and raised in temperature up to 60° C., followed by a polymerization reaction for 6 hours. This gave a polymer solution containing a polymer (prepared pressure-sensitive adhesive solution). This polymer solution was defined as "polymer solution (B)". The polymer in the polymer solution. (B) had a solids concentration of 40.0% (in mass percent) and a weight-average molecular weight of $50 \times 10^4$.

Acrylic Polymer Solution Preparation Example 3

In a four-neck flask equipped with stirring blades, a thermometer, a nitrogen gas inlet tube, and a condenser, were placed 10 parts by mass of acrylic acid (2EHA) and 90 parts by mass of 2-ethylhexyl acrylate (2EHA), together with 199 parts by mass of ethyl acetate as a polymerization solvent. Next, the solution in the flask was stirred for 2 hours with a nitrogen gas being introduced. After removing oxygen from the polymerization system in the above manner, the solution in the flask was combined with 0.6 part by mass of benzoyl peroxide (trade name NYPER BW, supplied by NOF Corporation) as a thermal initiator and raised in temperature up to 60° C., followed by a polymerization reaction for 6 hours. After quenching, 137 parts by mass of toluene were added and yielded a polymer solution containing polymer (prepared pressure-sensitive adhesive solution). This polymer solution was defined as "polymer solution (C)". The polymer in the polymer solution (C) had a solids concentration of 23.0% (in mass percent) and a weight-average molecular weight of $80 \times 10^4$.

Example 1

The polymer solution (A) was combined with a multifunctional acrylic oligomer, namely, a multifunctional urethane acrylate (trade name SHIKOH UV-7650B, having a weight-average molecular weight of 2300, a number of functional groups of 4 to 5, and a solids concentration of 99 mass percent, supplied by Nippon Synthetic Chemical Industry Co., Ltd.) in a proportion of 10 parts by mass per 100 parts by mass of the polymer in the polymer solution; and further combined with a photoinitiator (trade name Irgacure 184, supplied by BASF Japan. Ltd.) in a proportion of 0.2 part by mass per 100 parts by mass of the polymer in the polymer solution. The solution was thoroughly stirred until these components were dissolved. After stirring, the solution was combined with a silane coupling agent, namely, 3-glycidoxypropyltrimethoxysilane (trade name KBM-403, supplied by Shin-Etsu Chemical Co., Ltd.) in a proportion of 0.3 part by mass per 100 parts by mass of the polymer in the polymer solution, and further combined with a crosslinker, namely, an adduct of xylylene diisocyanate with trimethylolpropane (trade name TAKENATE D-110N, having a solids concentration of 75 mass percent, supplied by Mitsui Chemicals Inc.) in a proportion of 0.2 part by mass per 100 parts by mass of the polymer in the polymer solution. Next, the solution was diluted with ethyl acetate so as to have a solids concentration of 30.0 mass percent, was thoroughly stirred, and yielded a pressure-sensitive adhesive composition (solvent-borne pressure-sensitive adhesive composition). Separately, a separator was prepared as a release liner being made of a poly(ethylene terephthalate), having a surface treated with a silicone release agent, and having a thickness of 38 μm (trade name MRF38, supplied by Mitsubishi Plastics, Inc.). Next, the pressure-sensitive adhesive composition was applied to the release-treated surface of the separator so as to allow a pressure-sensitive adhesive layer to have a thickness (dried coat layer thickness) of 50 μm after drying and yielded a coat layer (pressure-sensitive adhesive composition layer). Next, the coated layer was dried at 100° C. for 2 minutes and yielded a pressure-sensitive adhesive layer on the separator. Separately, another separator (second separator) was prepared as a release liner being made of a poly (ethylene terephthalate), having a surface treated with a silicone release agent, and having a thickness of 38 μm (trade name MRE38, supplied by Mitsubishi Plastics, Inc.). Next, the second separator was laminated onto the surface (adhesive face) of the above-obtained pressure-sensitive adhesive layer so that the release-treated surface of the second separator was in contact with the adhesive face of the pressure-sensitive adhesive layer. This gave a transfer double-sided pressure-sensitive adhesive sheet having a multilayer structure including the separator (MRF), the pressure-sensitive adhesive layer, and the separator (MRE) disposed in the specified sequence. Before being subjected to evaluations and measurements as mentioned below, the double-sided pressure-sensitive adhesive sheet prepared in the above manner was left stand at an ambient temperature of 50° C. for 24 hours in a shade sheet so as to block light.

Examples 2 to 15

Pressure-sensitive adhesive sheets were prepared by a procedure similar to that in Example 1, except for using a different type of a multifunctional acrylic oligomer in a different amount; using the silage coupling agent in a different proportion (blending amount); and using the crosslinker in a different proportion. (blending amount) as given in Table 1, instead of those employed in Example 1.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Polymer solution | | | A | A | A | A | A | A | A | A | A | A |
| Polymer | Monomer formula | 2EHA | 63 | 63 | 63 | 63 | 63 | 63 | 63 | 63 | 63 | 63 |
| | | MMA | 9 | 9 | 9 | 9 | 9 | 9 | 9 | 9 | 9 | 9 |
| | | NVP | 15 | 15 | 15 | 15 | 15 | 15 | 15 | 15 | 15 | 15 |
| | | HEA | 13 | 13 | 13 | 13 | 13 | 13 | 13 | 13 | 13 | 13 |
| | | AA | | | | | | | | | | |
| | Weight-average molecular weight | | $85 \times 10^4$ | $85 \times 10^4$ | $85 \times 10^4$ | $85 \times 10^4$ | $85 \times 10^4$ | $85 \times 10^4$ | $85 \times 10^4$ | $85 \times 10^4$ | $85 \times 10^4$ | $85 \times 10^4$ |
| Multifunctional acrylic oligomer | UV-7650B | | 10 | | | | | | | | | |
| | UV-1700B | | | 10 | | | | | | | | |
| | UV-7600B | | | | 10 | | | | | | | |
| | UV-7605B | | | | | 10 | | | | | | |
| | UA-306T | | | | | | 10 | | | | | |
| | UA-306I | | | | | | | 10 | | | | |
| | UA-306H | | | | | | | | 10 | | | |
| | UA-1100H | | | | | | | | | 10 | | |
| | UA-510H | | | | | | | | | | 10 | |
| | LIGHT ACRYLATE BP-4EAL | | | | | | | | | | | 20 |
| | UV-6640B | | | | | | | | | | | |
| Basic monomer | DMAPMA | | | | | | | | | | | |
| Photoinitiator | Irgacure. 184 | | 0.2 | 0.2 | 0.2 | 0.2 | 0.2 | 0.2 | 0.2 | 0.2 | 0.2 | 0.2 |
| | Irgacure. 819 | | | | | | | | | | | |
| Crosslinker | TAKENATE D-110N | | 0.2 | 0.2 | 0.2 | 0.2 | 0.2 | 0.2 | 0.2 | 0.2 | | 0.2 |
| | CORONATE L | | | | | | | | | | | |
| Silane coupling agent | KBM-403 | | 0.3 | 0.3 | 0.3 | 0.3 | 0.3 | 0.3 | 0.3 | 0.3 | | 0.3 |

| | | | Examples | | | | | | | | |
|---|---|---|---|---|---|---|---|---|---|---|---|
| | | | 11 | 12 | 13 | 14 | 15 | 16 | 17 | 18 | 19 |
| Polymer solution | | | A | A | A | A | A | A | A | A | C |
| Polymer | Monomer formula | 2EHA | 63 | 63 | 63 | 63 | 63 | 63 | 63 | 63 | 90 |
| | | MMA | 9 | 9 | 9 | 9 | 9 | 9 | 9 | 9 | |
| | | NVP | 15 | 15 | 15 | 15 | 15 | 15 | 15 | 15 | |
| | | HEA | 13 | 13 | 13 | 13 | 13 | 13 | 13 | 13 | |
| | | AA | | | | | | | | | 10 |
| | Weight-average molecular weight | | $85 \times 10^4$ | $85 \times 10^4$ | $85 \times 10^4$ | $85 \times 10^4$ | $85 \times 10^4$ | $85 \times 10^4$ | $85 \times 10^4$ | $85 \times 10^4$ | $100 \times 10^4$ |
| Multifunctional acrylic oligomer | UV-7650B | | | 15 | 20 | | 10 | 10 | 10 | | 20 |
| | UV-1700B | | | | | | | | | | |
| | UV-7600B | | | | | | | | | | |
| | UV-7605B | | | | | | | | | | |
| | UA-306T | | | | | | | | | | |
| | UA-306I | | | | | | | | | | |
| | UA-306H | | | | | 15 | | | | 10 | |
| | UA-1100H | | | | | | | | | | |
| | UA-510H | | | | | | | | | | |
| | LIGHT ACRYLATE BP-4EAL | | 30 | | | | | | | | |
| | UV-6640B | | | | | | 10 | | | | |
| Basic monomer | DMAPMA | | | | | | | 5 | 10 | | |
| Photoinitiator | Irgacure. 184 | | 0.2 | 0.2 | 0.2 | 0.2 | 0.2 | 0.2 | 0.2 | 0.4 | 0.2 |
| | Irgacure. 819 | | | | | | | | | 0.4 | |
| Crosslinker | TAKENATE D-110N | | 0.2 | 0.2 | 0.2 | 0.2 | | | | | |
| | CORONATE L | | | | | | | | | | 1 |
| Silane coupling agent | KBM-403 | | 0.3 | 0.3 | 0.3 | 0.3 | | | | | |

In Table 1, the abbreviations stand for as follows. Relating to the monomer formula, "2EHA" stands for 2-ethylhexyl acrylate; "MMA" stands for methyl methacrylate; "NVP" stands for N-vinylpyrrolidone; "HEA" stands for 2-hydroxyethyl acrylate; and "AA" stands for acrylic acid. Relating to the multifunctional acrylic oligomers, "UV-7650B" stands for a urethane acrylate (trade name UV-7650B, high hardness, having a number of functional groups of 4 to 5, a weight-average molecular weight of 2300, and a hardness of 2H, supplied by Nippon Synthetic Chemical Industry Co., Ltd.); "UV-1700B" stands for a urethane acrylate (trade name SHIKOH UV-1700B, high hardness, having a number of functional groups of 10, a weight-average molecular weight of 2000, and a hardness of 4H, supplied by Nippon Synthetic Chemical Industry Co., Ltd.); "UV 600B" stands for a urethane acrylate (trade name SHIKOH UV-7600B, high hardness, having a number of functional groups of 6, a weight-average molecular weight of 1400, and a hardness of 3H, supplied by Nippon Synthetic Chemical Industry Co., Ltd.); "UV-76051B" stands for a urethane acrylate (trade name SHIKOH UV-7605B, high hardness, having a number of functional groups of 6, a weight-average molecular weight of 1100, and a hardness of 3H to 4H, supplied by Nippon Synthetic Chemical Industry Co., Ltd.); "UA-306T" stands for a urethane acrylate (trade name UA-306T, a urethane polymer (pentaerythritol triacrylate-toluene diisocyanate), having a number of functional groups of 6, a weight-average molecular weight of 1270, and a hardness of 5H, supplied by Kyoeisha Chemical Co., Ltd.); "UA-306I" stands for a urethane acrylate (trade name UA-306I, a urethane polymer (pentaerythritol triacrylate-isophorone diisocyanate), having a number of functional groups of 6, a weight-average molecular weight of 1150, and a hardness of 5H, supplied by Kyoeisha Chemical Co., Ltd.); "UA-306H" stands for a urethane acrylate (trade name UA-306H, a urethane polymer (pentaerythritol triacrylate-hexamethylene diisocyanate), having a number of functional groups of 6, a weight-average molecular weight of 1350, and a hardness of 6H, supplied by Kyoeisha Chemical Co., Ltd.); "UA-1100H" stands for a urethane acrylate (trade name UA-1100H, high hardness, non-yellowing, having a number of functional groups of 6, a weight-average molecular weight of 760, and a hardness of 6H, supplied by Shin-Nakamura Chemical Co., Ltd.); "UA-510H" stands for a urethane acrylate (trade name UA-510H, a urethane polymer (pentaerythritol pentaacrylate-hexamethylene diisocyanate), having a number of functional groups of 10, a weight-average molecular weight of 1950, and a hardness of 5H, supplied by Kyoeisha Chemical Co., Ltd.); "Light Acrylate BP-4EAL" stands for a bisphenol-A ethylen oxide adduct diacrylate (trade name Light Acrylate BP-4EAL, having a number of functional groups of 2, a weight-average molecular weight of 500, and a glass transition temperature Tg of 75° C., supplied by Kyoeisha Chemical Co., Ltd.); and "UV-6640B" stands for a urethane acrylate (trade name SHIKOH UV-6640B, an ether, having a number of functional groups of 5, a weight-average molecular weight of 5000, a hardness of 3B, and a glass transition temperature Tg of 12° C., supplied by Nippon Synthetic Chemical Industry Co., Ltd.). Relating to the basic monomer, "DMAPMA" stands for N-[3-(dimethylamino)propyl]methacrylamide. Relating to the photoinitiators, "Irgacure 184" stands for a photoinitiator (trade name Irgacure 184, supplied by BASS Japan Ltd.); and "Irgacure 819" stands for a photoinitiator (trade name Irgacure 819, supplied by BASF Japan. Ltd.). Relating to the crosslinkers, "TAKENATE D-110N" stands for an adduct of xylylene diisocyanate with trimethylolpropane (trade name TAKENATE D-110N, having a solids concentration of 75 mass percent, supplied by Mitsui Chemicals Inc.); and "CORONATE L" stands for an aromatic polyisocyanate (trade name CORONATE L, having a solids concentration of 75 mass percent, supplied by Nippon Polyurethane industry Co., Ltd.). Relating to the silane coupling agent, "KBM-403" stands for a 3-glycidoxypropyltrimethoxysilane (trade name KBM-403, supplied by Shin-Etsu Chemical Co., Ltd.).

Example 16

The polymer solution (A) was combined with a multifunctional acrylic oligomer, namely, a multifunctional urethane acrylate (trade name SHIKOH UV-7650B, having a weight-average molecular weight of 2300, a number of functional groups of 4 to 5, and a solids concentration of 99 mass percent, supplied by Nippon. Synthetic Chemical Industry Co., Ltd.) in a proportion of 10 parts by mass per 100 parts by mass of the polymer in the polymer solution, and further combined with a photoinitiator (trade name Irgacure 184, supplied by BASE Japan Ltd.) in a proportion of 0.2 part by mass per 100 parts by mass of the polymer in the polymer solution. The solution was thoroughly stirred until these components were dissolved. After stirring, the solution was combined with a basic monomer, namely, N-(3-dimethyiaminopropyl)methacryiamide (trade name DMAPMA, supplied by Evonik Japan Co., Ltd.) in a proportion of 5 parts by mass per 100 parts by mass of the polymer in the polymer solution. Next, the solution was diluted with ethyl acetate so as to have a solids concentration of 30.0 mass percent, was thoroughly stirred, and yielded a pressure-sensitive adhesive composition (solvent-borne pressure-sensitive adhesive composition). Except for using this pressure-sensitive adhesive composition, a transfer double-sided pressure-sensitive adhesive sheet was prepared by a procedure similar to that in Example 1.

Example 17

A transfer double-sided pressure-sensitive adhesive sheet was prepared by a procedure similar to that in Example 16, except for using the basic monomer N-(3-dimethylaminopropyl)methacrylamide is a proportion of 10 parts by mass, instead of 5 parts by mass.

Example 18

The polymer solution (A) was combined with a multifunctional acrylic oligomer, namely, a multifunctional urethane acrylate (trade name UA-306H, a urethane polymer (pentaerythritol triacrylate-hexamethylene diisocyanate), having a number of functional groups of 6, a weight-average molecular weight of 1350, and a hardness of 6H, supplied by Kyoeisha Chemical Co., Ltd.) in a proportion of 10 parts by mass per 100 parts by mass of the polymer in the polymer solution, was further combined with a photoinitiator (trade name Irgacure 184, supplied by BASF Japan. Ltd.) is a proportion of 0.4 part by mass per 100 parts by mass of the polymer in the polymer solution, and was further combined with a photoinitiator (trade name Irgacure 819, supplied by BASF Japan Ltd.) in a proportion of 0.4 part by mass per 100 parts by mass of the polymer in the polymer solution. The solution was thoroughly stirred until these components were dissolved. Next, the solution was diluted with ethyl acetate so as to have a solids concentration of 30.0 mass percent, was thoroughly stirred, and yielded a pressure-sensitive adhesive composition (solvent-borne pressure-sensitive adhesive composition). Except for using this pressure-sensitive adhesive composition, a transfer double-sided pressure-sensitive adhesive sheet was prepared by a procedure similar to that in Example 1.

Example 19

A pressure-sensitive adhesive composition (solvent-borne pressure-sensitive adhesive composition) was prepared by a procedure similar to that in Example 1, except for: using the polymer solution (C) instead of the polymer solution (A); not using the silane coupling agent; and using, as a crosslinker, an aromatic polyisocyanate (trade name CORO- NATE L, having a solids concentration of 75 mass percent, supplied by Nippon Polyurethane Industry Co., Ltd.) in a proportion of 1.0 part by mass per 100 parts by mass of the polymer in the polymer solution, instead of the adduct of xylylene diisocyanate with trimethylolpropane (trade name TAKENATE D-110N, having a solids concentration of 75 mass percent, supplied by Mitsui Chemicals Inc.). Except for using the prepared pressure-sensitive adhesive composition, a transfer double-sided pressure-sensitive adhesive sheet was prepared by a procedure similar to that in Example 1.

Comparative Examples 1 and 3 to 7

Pressure-sensitive adhesive sheets were each prepared by a procedure similar to that in Example 1, except for using a different multifunctional acrylic oligomer in a different proportion, using the silane coupling agent in a different proportion (blending amount), and using the crosslinker in a different proportion (blending amount) as given in Table 2, instead of those employed in Example 1.

Comparative Example 2

The polymer solution (B) was combined: with a rosin resin (trade name PENSEL D-125, having a solids content of 100%, supplied by Arakawa Chemical Industries, Ltd.) in a proportion of 4 parts by mass per 100 parts by mass of the polymer in the polymer solution; with a rosin resin (trade name SUPER ESTER A-100, having a solids content of 100%, supplied by Arakawa Chemical Industries, Ltd.) in a proportion of 4 parts by mass per 100 parts by mass of the polymer in the polymer solution; with a rosin resin (trade name Foralyn 8020F, having a solids content of 100%, supplied by Eastman Chemical Company) in a proportion of 2 parts by mass per 100 parts by mass of the polymer in the polymer solution; and with a terpene phenol resin (trade name TAMANOL 8031, having a solids content of 100%, supplied by Arakawa Chemical Industries, Ltd.) in a proportion of 6 parts by mass per 100 parts by mass of the polymer in the polymer solution. The solution was thoroughly stirred until these components were dissolved. After stirring, the solution was combined with a crosslinker, namely, an aromatic polyisocyanate (trade name CORNATE L, having a solids concentration of 75 mass percent, supplied by Nippon Polyurethane Industry Co., Ltd.) in a proportion of 1.1 parts by mass per 100 parts by mass of the polymer in the polymer solution, was thoroughly stirred, and yielded a pressure-sensitive adhesive composition (solvent-borne pressure-sensitive adhesive composition). Except for using this pressure-sensitive adhesive composition, a transfer double-sided pressure-sensitive adhesive sheet was prepared by a procedure similar to that in Example 1.

TABLE 2

| | | | Comparative Examples | | | | | | |
|---|---|---|---|---|---|---|---|---|---|
| | | | 1 | 2 | 3 | 4 | 5 | 6 | 7 |
| Polymer | Polymer solution | | A | B | A | A | A | A | A |
| | Monomer formula | 2EHA | 63 | | 63 | 63 | 63 | 63 | 63 |
| | | BA | | 92 | | | | | |
| | | MMA | 9 | | 9 | 9 | 9 | 9 | 9 |
| | | NVP | 15 | | 15 | 15 | 15 | 15 | 15 |
| | | VAc | | 5 | | | | | |
| | | AA | | 2.9 | | | | | |
| | | HEA | 13 | 0.1 | 13 | 13 | 13 | 13 | 13 |
| | Weight-average molecular weight | | $85 \times 10^4$ | $50 \times 10^4$ | $85 \times 10^4$ | $85 \times 10^4$ | $85 \times 10^4$ | $85 \times 10^4$ | $85 \times 10^4$ |
| Multifunctional acrylic oligomer | UV-7650B | | | | 60 | | | | |
| | LIGHT ACRYLATE BP-4EAL | | | | | 60 | | | |
| | UA-306H | | | | | | 30 | | |
| | APG-400 | | | | | | | 10 | |
| | APG-700 | | | | | | | | 20 |
| Tackifier resin | PENSEL D-125 | | | 4 | | | | | |
| | SUPER ESTER A-100 | | | 4 | | | | | |
| | Foralyn 8020F | | | 2 | | | | | |
| | TAMANOL 803 | | | 6 | | | | | |
| Photoinitiator | Irgacure 184 | | | | 0.2 | 0.2 | 0.2 | 0.2 | 0.1 |
| Crosslinker | CORONATE L | | | 2 | | | | | |
| | TAKENATE D-110N | | 0.2 | | 0.2 | 0.2 | 0.2 | 0.2 | 0.06 |
| Silane coupling agent | KBM-403 | | 0.3 | | 0.3 | 0.3 | 0.3 | 0.3 | 0.3 |

In Table 2, the abbreviations stand for as follows. Relating to the monomer formula, "2EHA" stands for 2-ethylhexyl acrylate; "BA" stands for butyl acrylate; "MMA" stands for methyl methacrylate; "NVP" stands for N-vinylpyrrolidone; "VAc" stands for vinyl acetate; "AA" stands for acrylic acid; and "HEA" stands for 2-hydroxyethyl acrylate. Relating to the multifunctional acrylic oligomers, "UV-7650B" stands for a urethane acrylate (trade name UV-7650B, high hardness, having a number of functional groups of 4 to 5, a weight-average molecular weight of 2300, and a hardness of 2H, supplied by Nippon Synthetic Chemical Industry Co., Ltd.) "Light Acrylate BP-4EAL" stands for a bisphenol-A ethylene oxide adduct diacrylate (trade name Light Acrylate BP-4EAL, having a number of functional groups of 2, a weight-average molecular weight of 500, and a glass transition temperature Tg of 75° C., supplied by Kyoeisha Chemical Co., Ltd.); "UA-306H" stands for a urethane acrylate (trade name UA-306H, a urethane polymer (pentaerythritol triacrylate-hexamethylene diisocyanate), having a number of functional groups of 6, a weight-average molecular weight of 1350, and a hardness of 6H, supplied by Kyoeisha Chemical Co., Ltd.); "APG-400" stands for a polypropylene glycol (#400) diacrylate (trade name APG- 400, having a number of functional groups of 2, a weight-average molecular weight of 536, and a glass transition temperature Tg of −8° C., supplied by Shin-Nakamura Chemical Co., Ltd.) and "APG-700" stands for a polypropylene glycol (#700) diacrylate (trade name APG-700, having a number of functional groups of 2, a weight-average molecular weight of 808, and a glass transition temperature Tg of −32° C., supplied by Shin-Nakamura Chemical Co., Ltd.). Relating to the tackifier resins, "PENSEL D-125" stands for a rosin resin (trade name PENSEL D-125, having a solids content of 100%, supplied by Arakawa Chemical Industries, Ltd.); "SUPER ESTER A-100" stands for a rosin resin (trade name SUPER ESTER A-100, having a solids content of 100%, supplied by Arakawa Chemical Industries, Ltd.); "Foralyn 8020F" stands for a rosin resin (trade name Foralyn 8020F, having a solids content of 100%, supplied by Eastman Chemical Company); and "TAMANOL 803" stands for a terpene phenol resin (trade name TAMANOL 803L, having a solids content of 100%, supplied by Arakawa Chemical Industries, Ltd.). Relating to the photoinitiator, "Irgacure 184" stands for a photoinitiator (trade name Irgacure 184, supplied by BASF Japan Ltd.). Relating to the crosslinkers, "CORONATE L" stands for an aromatic polyisocyanate (trade name CORONATE L, having a solids concentration of 75 mass percent, supplied by Nippon Polyurethane Industry Co., Ltd.); and "TAKENATE D-110N" stands for an adduct of xylylene diisocyanate with trimethylolpropane (trade name TAKENATE D-110N, having a solids concentration of 75 mass percent, supplied by Mitsui Chemicals Inc.). Relating to the silane coupling agent, "KBM-403" stands for 3-glycidoxypropyltrimethoxysilane (trade name KBM-403, supplied by Shin-Etsu Chemical Co., Ltd.).

Evaluations

The double-sided pressure-sensitive adhesive sheets prepared in the examples and the comparative examples were subjected to measurements or evaluations as follows. The measurement results or evaluations are presented in Tables 3, 4, and 5.

Weight-Average Molecular Weight

The weight-average molecular weight of each of the prepared polymers was measured by gel permeation chromatography (GPO) under conditions listed below. A sample solution to be subjected to the measurement was prepared in the following manner. A polymer specimen was dissolved in tetrahydrofuran to give a 0.1 mass percent solution, this was left stand overnight, filtrated through a 0.45-μm membrane filter to give a filtrate, and the filtrate was used as the sample solution.

Analyzer: HLC-8120GPC (suppled by TOSOH CORPORATION)
Column: TSKgel GMH$_{HR}$-H(S) (supplied by TOSOFI CORPORATION)
Column size: 7.8 mm in diameter by 30 cm in length
Eluent: tetrahydxofuran (concentration: 0.1 mass percent)
Flow rate: 0.5 mi/min
Detector: differential refractometer (RI)
Column temperature: 40° C.
Injection volume: 100 μl
Reference standard: polystyrene Gel Fraction The gel fraction of the pressure-sensitive adhesive layer in each pressure-sensitive adhesive sheet was determined in the following manner. About 0.1 g (mass: $W_1$ mg) of a pressure-sensitive adhesive sample was collected from the pressure-sensitive adhesive layer of the pressure-sensitive adhesive sheet, was wrapped with a tetrafluoroethylene resin porous membrane (mass: $W_2$ mg) having an average pore size of 0.2 μm into a pouch, the opening of the pouch was tied with a kite string (mass: $W_3$ mg), and yielded a package. The package was placed in a 50-mL capacity screw-capped tube, and the screw-capped tube was filled with ethyl acetate (one screw-capped tube was used per package). This was left stand at room temperature (typically 23° C.) for 7 days, and the package was recovered from the screw-capped tube and dried at 130° C. for 2 hours. Subsequently the mass ($W_4$ mg) of the package was measured. The values of $W_1$ to $W_4$ were substituted into the following equation to calculate the gel fraction of the pressure-sensitive adhesive layer.

$$\text{Gel fraction (in mass percent)} = [(W_4 - W_2 - W_3)/W_1] \times 100$$

A non-limiting example of the tetrafluoroethylene resin porous membrane is the product under the trade name NITOFLON® NTF1122 supplied by Nitto Denko Corporation. The pressure-sensitive adhesive sheets to be subjected to the gel fraction measurement were stored as covered with a shade sheet so as to block light. For each example and each comparative example, the "gel fraction (before UV irradiation)" was measured using a specimen not subjected to UV irradiation (ultraviolet irradiation), namely, using the specimen stored as covered with a shade sheet so as to block light. For each example and each comparative example, the "gel fraction (after UV irradiation)" was determined using a specimen prepared by applying an ultraviolet ray to the surface of the pressure-sensitive adhesive sheet covered with the separator (MRE) to cure the pressure-sensitive adhesive layer, where the pressure-sensitive adhesive sheet had been stored as covered with a shade sheet so as to block light, before UV irradiation. The ultraviolet ray was applied using a metal halide lamp light source (M30001/22, supplied by TOSHIBA CORPORATION) at an fluminance of 300 mW/cm$^2$ to a cumulative dose of 3000 mJ/cm$^2$.

Young's Modulus (before UV Irradiation)

The Young's modulus (before UV irradiation) of the pressure-sensitive adhesive layer in each pressure-sensitive adhesive sheet was determined in the following manner. Initially, the pressure-sensitive adhesive layer was sampled from the pressure-sensitive adhesive sheet before ultraviolet irradiation, was rolled up cylindrically, and yielded a cylindrical measurement sample having a diameter of 3 mm and a length of 30 mm. Next, the measurement sample was placed in a tensile tester (trade name Tensile and Compression Testing Machine TG-1 kN, supplied by Minebea Co., Ltd.) so as to give a chuck-to-chuck distance (corresponding to the initial length of sample to be measured) in the tester of 10 mm. The measurement sample was pulled at a tensile speed of 10 mm/min. The measurement was performed in a measurement environment at a temperature of 23° C. and relative humidity of 50%. The Young's modulus was calculated on the basis of the measured the strain and the stress. The measurement sample to be subjected to the measurement as above had been stored before the measurement, as covered with a shade sheet so as to block light.

Young's Modulus (after UV Irradiation)

The Young's modulus (after UV irradiation) of the pressure-sensitive adhesive layer in each pressure-sensitive adhesive sheet was determined in the following manner. The pressure-sensitive adhesive sheet herein was a transfer double-sided pressure-sensitive adhesive sheet having a multilayer structure including the separator (MRF), the pressure-sensitive adhesive layer, and the separator (MRE) disposed in the specified sequence. An ultraviolet ray was applied to the separator (MRE) surface of the pressure-sensitive adhesive sheet to cure the pressure-sensitive adhesive layer, where the ultraviolet irradiation was performed at an illuminance of 300 mW/cm$^2$ to a cumulative dose of 3000 mJ/cm$^2$ using a metal halide lamp (M3000L/22, supplied by TOSHIBA CORPORATION). Next, a specimen of the cured pressure-sensitive adhesive layer was sampled from the pressure-sensitive adhesive sheet after ultraviolet irradiation, was rolled up cylindrically, and yielded a cylindrical measurement sample having a diameter of 3 mm and a length of 30 mm. Next, the measurement sample was placed in a tensile tester (trade name Tensile and Compression Testing Machine TG-1 kN, supplied by Minebea Co., Ltd.) so as to give a chuck-to-chuck distance (corresponding to the initial length of sample to be measured) in the tester of 10 mm. The measurement sample was pulled at a tensile speed of 10 mm/min in a measurement environment at a temperature of 23° C. and relative humidity of 50%. A Young's modulus was calculated on the basis of the measured the strain and the stress. The measurement sample to be subjected to the measurement, as above had been stored before the measurement, as covered with a shade sheet so as to block light.

Haze (before UV Irradiation)

The haze (before UV irradiation) of each pressure-sensitive adhesive sheet was determined in the following manner. Initailly, the separator (MRE) on one surface of the pressure-sensitive adhesive sheet was removed to expose a surface, the exposed surface of the pressure-sensitive adhesive sheet was laminated onto a glass slide (trade name SLIDE GLASS S1112, supplied by Matsunami Glass Ind., Ltd.), and from which the other separator (MRE) was removed. This gave a measurement sample. The haze of the measurement sample was measured using a measuring instrument HAZE METER HM-150 supplied by Murakami Color Research Laboratory. The pressure-sensitive adhesive sheet to be subjected to the measurement was one having been stored as covered with a shade sheet so as to block light.

Haze (after UV Irradiation)

The haze (after UV irradiation) of each pressure-sensitive adhesive sheet was determined in the following manner. Initially, the separator (MRE) on one surface of the pressure-sensitive adhesive sheet was removed to expose a surface, the exposed surface of the pressure-sensitive adhesive sheet was laminated onto a glass slide (trade name SLIDE GLASS S1112, supplied by Matsunami Glass Ind., Ltd.), and an ultraviolet ray was applied to the other surface of the pressure-sensitive adhesive sheet covered with the other separator (MRF) to cure the pressure-sensitive adhesive layer, where the ultraviolet irradiation was performed at an illuminance of 300 mW cm$^2$ to a cumulative dose of 3000 mJ/cm$^2$. Thereafter the separator (MRF) was removed. This gave a measurement sample. The haze of the measurement sample was measured using a measuring instrument HAZE METER HM-150 supplied by Murakami Color Research Laboratory. The pressure-sensitive adhesive sheet to be subjected to the measurement was one having been stored as covered with a shade sheet so as to block light.

Adhesive Strength (Before UV Irradiation)

The "adhesive strength (before UV irradiation)" of each pressure-sensitive adhesive sheet was determined in the following manner. Initially, the separator (MRE) on one surface of the pressure-sensitive adhesive sheet was removed to expose an adhesive face, and a 50-µm thick poly (ethylene terephthalate) (PET) film was applied to the exposed adhesive face to back the pressure-sensitive adhesive sheet with the PET film. A test specimen (having a width of 20 mm and a length of 100 mm) was cut out from the backed pressure-sensitive adhesive sheet. The separator (MRF) was removed from the other surface of the test specimen to expose the other adhesive face, and, through the exposed adhesive face, the test specimen was laminated onto an adherend, followed by compression bonding with each other via one reciprocating movement of a 2-kg roller thereon. The resulting article was stored for 24 hours. After storage, the test specimen was peeled off from the adherend at a tensile speed of 300 mm/min and a peel angle of 180° using a tensile tester (trade name Tensile and Compression Testing Machine TG-1 kN, supplied by Minebea Co., Ltd.), and a peel strength. (N/20 mm) was measured. This peel strength was defined as the adhesive strength before UV irradiation. The preparation and storage of the test specimen, and the measurement of the peel strength were performed at an ambient temperature of 23° C. and relative humidity of 50%. The preparation and storage of the test specimen were performed while the test specimen was covered a shade sheet so as to block light. On each example and each comparative example, the adhesive strength measurement as above was performed both on a stainless steel plate (SUS304) as the adherend and on a polycarbonate resin plate (PC plate) as the adherend.

Adhesive Strength (after UV Irradiation)

The "adhesive strength (after UV irradiation)" of each pressure-sensitive adhesive sheet was determined in the following manner. Initially, the separator (MRE) on one surface of the pressure-sensitive adhesive sheet was removed to expose an adhesive face, and a 50-µm thick poly(ethylene terephthalate) (PET) film was applied to the exposed adhesive face to back the pressure-sensitive adhesive sheet. A test specimen (having a width of 20 mm and a length of 100 mm) was cut out from the backed pressure-sensitive adhesive sheet. The separator on the other surface was removed from the test specimen to expose a surface, and the test specimen was laminated through the exposed surface to an adherend, followed by compression bonding with each other via one reciprocating movement of a 2-kg roller thereon. The resulting article was stored for 12 hours. After storage, an ultraviolet ray was applied to the test specimen from the PET film side to cure the pressure-sensitive adhesive layer of the test specimen. The ultraviolet irradiation was performed at an ultraviolet illuminance of 300 mN/cm$^2$ to a cumulative dose of 3000 mJ/cm$^2$ using a metal halide lamp (M3000L/22, supplied by TOSHIBA CORPORATION). After the ultraviolet irradiation as above, the test specimen was stored for further 12 hours. After storage, the test specimen was peeled off from the adherend at a tensile speed of 300 mm/min and a peel angle of 180° using a tensile tester (trade name Tensile and Compression Testing Machine TG-1 kN, supplied by Minebea Co., Ltd.), and a peel strength (N/20 mm) was measured. This peel strength was defined as the adhesive strength after UV irradiation. The preparation and storage of the test specimen, the ultraviolet irradiation, and the peel strength measurement were performed at an ambient temperature of 23° C. and relative humidity of 50%. While the preparation and storage of the test specimen were performed, the test specimen was covered with a shade sheet so as to block light. On each example and each comparative example, the adhesive strength measurement as above was performed both on a stainless steel plate (SU304) as the adherend and on a polycarbonate resin plate (PC plate) as the adherend.

Force Transmissibility Evaluation

Assume that external force acts upon a pressure-sensitive adhesive sheet. In this case, whether the pressure-sensitive adhesive sheet can efficiently transmit the force may be evaluated or determined on the basis of deformation amount (degree of deformation) of the pressure-sensitive adhesive sheet upon receiving of such external force by the pressure-sensitive adhesive sheet. Namely, when external force acts upon a pressure-sensitive adhesive sheet, the pressure-sensitive adhesive sheet accumulates a smaller amount of deformation energy, and, proportionally, causes smaller loss upon force transmission with a decreasing deformation amount of the pressure-sensitive adhesive sheet. Specifically, an "elongation percentage versus load" was measured in a manner mentioned below, and the force transmissibility was evaluated on the basis of measurement results according to the following criteria.

Force Transmissibility Evaluation Criteria

Very good: Having an elongation percentage versus load of 30% or less;

Good: Having an elongation percentage versus load of from greater than 30% to 50%;

Fair: Having an elongation percentage versus load of from greater than 50% to 100%; and Poor: Having an elongation percentage versus load of greater than 100%.

Elongation Percentage Versus Load (before UV Irradiation)

Initially, a pressure-sensitive adhesive layer was sampled from each pressure-sensitive adhesive sheet before ultraviolet irradiation, was rolled up cylindrically, and yielded a cylindrical measurement sample having a diameter of 3 mm and a length of 30 mm. Next, the measurement sample was placed in a tensile tester (trade name Tensile and Compression Testing Machine TG-1 kN, supplied by Minebea Co., Ltd.) so as to give a chuck-to-chuck distance (corresponding to the initial length of sample to be measured) in the tester of 10 mm. The measurement sample was pulled at a tensile speed of 10 mm/min. The measurement was performed in a measurement environment at a temperature of 23° C. and relative humidity of 50%. The resulting stress and strain were analyzed, and an elongation percentage was calculated on the basis of the change in length of the measurement sample at a load of 0.5 N/mm², according to the following equation:

Elongation percentage versus load (at a load of 0.5 N/mm²)(%)=(Change in length of the measurement sample at a load of 0.5 N/mm²)/(Sample initial length)×100

The "change in length" of the measurement sample refers to the amount of change of the measurement sample by the load, namely, the magnitude of elongation when the measurement sample is elongated by the action of load. For example, when a measurement sample having a length of 10 mm is elongated by 3 mm to have a length of 13 mm by the action of a longitudinally-acting load, the change in length is determined as 3 mm.

Elongation Percentage versus Load (after UV Irradiation)

Each sample pressure-sensitive adhesive sheet used herein was a transfer double-sided pressure-sensitive adhesive sheet having a multilayer structure including the separator (MRF), the pressure-sensitive adhesive layer, and the separator (MRE) disposed in the specified sequence. Initially, an ultraviolet ray was applied from the separator (MRE) side of the pressure-sensitive adhesive sheet to cure the pressure-sensitive adhesive layer, where the ultraviolet irradiation was performed at an illuminance of 300 mW/cm² to a cumulative dose of 3000 mJ/cm² using a metal halide lamp (M3000L/22, supplied by TOSHIBA CORPORATION). Next, the cured pressure-sensitive adhesive layer was sampled from the pressure-sensitive adhesive sheet after ultraviolet irradiation, rolled up cylindrically, and yielded a cylindrical measurement sample having a diameter of 3 mm and a length of 30 mm. Next, the measurement sample was placed in a tensile tester (trade name Tensile and Compression Testing Machine TG-1 kN, supplied by Minebea Co., Ltd.) so as to give a chuck-to-chuck distance of 10 mm (corresponding to the initial length of sample to be measured) in the tester. The measurement sample was pulled at a tensile speed of 10 mm/min, in a measurement environment at a temperature of 23° C. and relative humidity of 50%. A Young's modulus was calculated on the basis of the measured the strain and the stress. The measurement sample to be subjected to the measurement as above had been stored as covered with a shade sheet so as to block light, before the measurement. The resulting stress and strain were analyzed, and an elongation percentage was calculated on the basis of the change in length of the measurement sample at a load of 0.5 N/mm², according to the following equation:

Elongation percentage versus load (at a load of 0.5 N/mm²)(%)=(Change in length of the measurement sample at a load of 0.5 N/mm²)/(Sample initial length)×100

Metal-Corrosion Noncausative Properties Evaluation Method

A "rate of resistance change" was measured in a manner mentioned below, and, on the basis of the measurement result, the metal-corrosion noncausative properties were evaluated according to the following criteria.

Metal-Corrosion Noncausative Properties Evaluation Criteria:

Good: Having a rate of resistance change of less than 10%; and

Poor: Having a rate of resistance change of 10% or more.

Rate of Resistance Change (Rate of Resistance Change after ITO Corrosion Test)

Initially, a double-sided pressure-sensitive adhesive sheet (having a width of 25 mm and a length of 25 mm) was cut out from a double-sided pressure-sensitive adhesive tape (a substrate-supported double-sided pressure-sensitive adhesive tape having a layer structure including a separator, a pressure-sensitive adhesive layer, a substrate, and a pressure-sensitive adhesive layer disposed in the specified sequence, trade name No. 5606, supplied by Nitto Denko Corporation). The obtained double-sided pressure-sensitive adhesive sheet was laminated onto one side of a glass plate (having a width of 25 mm, a length of 25 mm, and a thickness of 7 mm) and yielded a laminate (laminate 1). Next, the separator was removed from the double-sided pressure-sensitive adhesive sheet in the laminate 1 to expose an adhesive face. Separately, an ITO film (having a width of 15 mm and a length of 15 mm) was cut out from an ITO film (a transparent conductive film having a layer structure including a PET film undergone a hard coat treatment (anti-glare treatment) (a PET film having a non-vapor-deposited surface), a pressure-sensitive adhesive layer, a PET film, and an ITO layer disposed in the specified sequence, trade name ELECRYSTA, supplied by Nitto Denko Corporation). The obtained ITO film was laminated onto the center of the exposed adhesive face of the laminate 1 so that the non-vapor-deposited surface was in contact with the adhesive face, and yielded a laminate (laminate 2). Next, a measurement sample (having a width of 8 mm and a length of 8 mm) was cut out from the measurement object pressure-sensitive adhesive sheet (transfer double-sided pressure-sensitive adhesive sheet having a multilayer structure including the separator (MRF), the pressure-sensitive adhesive layer, and the separator (MRE) disposed in the specified sequence). The separator (MRE) was removed from the measurement sample to expose an adhesive face, through which the measurement sample was laminated onto the center of the ITO layer surface (vapor-deposited surface) of the ITO film in the laminate 2, and yielded a laminate (laminate 3). Next, an electric resistance was measured at four measurement, points of the four corners of the ITO layer surface (vapor-deposited surface) of the ITO film in the laminate 3 using a Hall effect measurement system (device name HL5500PC, supplied by Nanometrics, formerly known as Accent Optical Technologies Inc.). The measured electric resistance was defined as "R1". After the electric resistance R1 measurement, the laminate 3 was left stand at a temperature of 60° C. and relative humidity of 95% for 500 hours and further left stand at a temperature of 23° C. and relative humidity of 50% for 1 hour. The electric resistance of the laminate 3 after standing was measured in a similar manner to above. The measured electric resistance was defined as "R2". A rate of electric resistance change was calculated according to the following equation:

Rate of electric resistance change (%)=[(R2−R1)/R1]×100

TABLE 3

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Gel fraction (%) | Before UV irradiation | 67.5 | 69.8 | 67.1 | 66.0 | 68.6 | 67.5 | 63.2 | 65.4 | 12 | 50.2 |
| | After UV irradiation | 94.9 | 96.0 | 95 | 95 | 95.6 | 95.3 | 94.2 | 94.6 | 93.4 | 85.5 |
| Young's modulus (kPa) | Before UV irradiation | 112.7 | 118.6 | 113.0 | 113.7 | 108.5 | 112.3 | 95.8 | 109.3 | 88.0 | 64.4 |
| | After UV irradiation | 1402.2 | 1203.5 | 1846.6 | 1430.5 | 2040.6 | 1707.6 | 2157.2 | 1605.0 | 1524.3 | 2226.0 |
| Haze (%) | Before UV irradiation | 0.7 | 0.8 | 0.6 | 0.5 | 0.6 | 0.5 | 0.6 | 0.6 | 0.8 | 0.4 |
| | After UV irradiation | 1.4 | 2.2 | 2.7 | 1.0 | 1.1 | 1.2 | 1.7 | 1.3 | 2.2 | 1.2 |
| Adhesive strength (N/20 mm) | SUS plate Before UV irradiation | 15.6 | 14.9 | 14.9 | 16.1 | 14.5 | 14.5 | 15.0 | 14.9 | 15.0 | 12.6 |
| | SUS plate After UV irradiation | 17 | 16.2 | 11.9 | 11.9 | 6.3 | 8.9 | 12.9 | 14.4 | 13.4 | 13.8 |
| | PC plate Before UV irradiation | 17.5 | 16.8 | 18.0 | 17.0 | 17.0 | 16.2 | 16.8 | 16.7 | 18.5 | 8.6 |
| | PC plate After UV irradiation | 13.8 | 13.5 | 14.5 | 13.2 | 6.8 | 8.3 | 12.9 | 10.5 | 11.2 | 9.3 |
| Elongation percentage versus load (load: 0.5 N/mm$^2$) (%) | Before UV irradiation | ≥1000 | ≥1000 | ≥1000 | ≥1000 | ≥1000 | ≥1000 | ≥1000 | ≥1000 | ≥1000 | ≥1000 |
| Force transmissibility | | Poor | Poor | Poor | Poor | Poor | Poor | Poor | Poor | Poor | Poor |
| Elongation percentage versus load (load: 0.5 N/mm$^2$) (%) | After UV irradiation | 16.1 | 21.8 | 13.3 | 14.7 | 13.3 | 14.3 | 10.0 | 15.3 | 15.5 | 7.3 |
| Force transmissibility | | Very good | Very good | Very good | Very good | Very good | Very good | Very good | Very good | Very good | Very good |
| Metal-corrosion noncausative properties | | Good | Good | Good | Good | Good | Good | Good | Good | Good | Good |

TABLE 4

| | | Example 11 | Example 12 | Example 13 | Example 14 | Example 15 | Example 16 | Example 17 | Example 18 | Example 19 |
|---|---|---|---|---|---|---|---|---|---|---|
| Gel fraction (%) | Before UV irradiation | 44.8 | 62.4 | 54.0 | 59.4 | 1.6 | 33.4 | 50.7 | 61.3 | 5.2 |
| | After UV irradiation | 86.7 | 94.2 | 95.9 | 92.8 | 90.8 | 87.3 | 83.2 | 92 | 91.2 |
| Young's modulus (kPa) | Before UV irradiation | 44.4 | 93.9 | 84.7 | 86.5 | 80.5 | 82.0 | 74.6 | 94.2 | 66.3 |
| | After UV irradiation | 4988.7 | 3035.6 | 4530.4 | 3514.8 | 2001.6 | 1598.2 | 1866.2 | 2187.4 | 1753.7 |
| Haze (%) | Before UV irradiation | 0.4 | 0.6 | 0.8 | 0.9 | 1.4 | 0.5 | 0.8 | 0.6 | 10.2 |
| | After UV irradiation | 1.2 | 1.3 | 1.9 | 3.6 | 4.4 | 1.2 | 1.4 | 1.7 | 15.0 |
| Adhesive strength (N/20 mm) | SUS plate Before UV irradiation | 10.9 | 14.5 | 16.3 | 13.5 | 14.9 | 11.5 | 10.5 | 15.0 | 17.0 |
| | SUS plate After UV irradiation | 9.1 | 15.8 | 9.8 | 10.0 | 12.3 | 17.1 | 15.5 | 8.0 | 8.1 |
| | PC plate Before UV irradiation | 0.7 | 17.5 | 16.0 | 16.2 | 17.9 | 16.9 | 15.6 | 16.8 | 16.4 |
| | PC plate After UV irradiation | 4.8 | 7.1 | 6.7 | 7.3 | 11.5 | 12.8 | 15.6 | 11.5 | 16.2 |
| Elongation percentage versus load (load: 0.5 N/mm$^2$) (%) | Before UV irradiation | ≥1000 | ≥1000 | ≥1000 | ≥1000 | ≥1000 | ≥1000 | ≥1000 | ≥1000 | ≥1000 |
| Force transmissibility | | Poor | Poor | Poor | Poor | Poor | Poor | Poor | Poor | Poor |
| Elongation percentage versus load (load: 0.5 N/mm$^2$) (%) | After UV irradiation | 3.5 | 10.5 | 2.7 | 9.1 | 15.0 | 14.5 | 9.3 | 21.0 | 15.7 |
| Force transmissibility | | Very good | Very good | Very good | Very good | Very good | Very good | Very good | Very good | Very good |
| Metal-corrosion noncausative properties | | Good | Good | Good | Good | Good | Good | Good | Good | Poor |

TABLE 5

|  |  | Comparative Examples 1 | Comparative Examples 2 | Comparative Examples 3 | Comparative Examples 4 | Comparative Examples 5 | Comparative Examples 6 | Comparative Examples 7 |
|---|---|---|---|---|---|---|---|---|
| Gel fraction (%) | Before UV irradiation | 61.7 | 20.3 | 49.3 | 33.9 | 52.8 | 55.1 | 2.6 |
|  | After UV irradiation |  |  | 96.7 | 89.5 | 94.5 | 69.2 | 59.3 |
| Young's modulus (kPa) | Before UV irradiation | 139.8 | 76.5 | 46.5 | 27.6 | 62.4 | 72.3 | 35.7 |
|  | After UV irradiation |  |  | 21196.4 | 11995.6 | 9775.8 | 147.7 | 157.0 |
| Haze (%) | Before UV irradiation | 0.5 | 4.1 | 2.2 | 70.6 | 1.7 | 0.5 | 0.3 |
|  | After UV irradiation | 0.5 | 4.5 | 6.5 | 82.7 | 9.6 | 0.6 | 0.8 |
| Adhesive strength (N/20 mm) SUS plate | Before UV irradiation | 20.8 | 15.5 | 14.5 | 2.0 | 11.1 | 11.2 | 13.5 |
|  | After UV irradiation |  |  | 0.1 | 1.9 | 1.2 | 25.3 | 19.3 |
| PC plate | Before UV irradiation | 19.8 | 16.5 | 15.5 | 0.1 | 14.0 | 12.8 | 15.4 |
|  | After UV irradiation |  |  | 0.8 | 0.4 | 2.3 | 23.9 | 18.1 |
| Elongation percentage versus load (load: 0.5 N/mm²) (%) | Before UV irradiation | ≥1000 | ≥1000 | ≥1000 | ≥1000 | ≥1000 | ≥1000 | ≥1000 |
| Force transmissibility |  | Poor | Poor | Poor | Poor | Poor | Poor | Poor |
| Elongation percentage versus load (load: 0.5 N/mm²) (%) | After UV irradiation |  |  | 0.3 | 1.0 | 1.8 | ≥1000 | 391.4 |
| Force transmissibility |  |  |  | Very good | Very good | Very good | Poor | Poor |
| Metal-corrosion noncausative properties |  | Good | Poor | Good | Good | Good | Good | Good |

As a summary of the above, the configurations of the present invention and variations thereof will be listed as appendices below.

APPENDIX 1

A pressure-sensitive adhesive sheet including an acrylic pressure-sensitive adhesive layer. The acrylic pressure-sensitive adhesive layer is curable by irradiation. The acrylic pressure-sensitive adhesive layer includes an acrylic polymer and a multifunctional acrylic oligomer. The acrylic pressure-sensitive adhesive layer, after curing, has a Young's modulus of 500 kPa to 10000 kPa at 23° C. The acrylic pressure-sensitive adhesive layer, after curing, has an adhesive strength of 3.0 N/20 mm or more.

APPENDIX 2

In the pressure-sensitive adhesive sheet according to Appendix 1, the acrylic pressure-sensitive adhesive layer before curing may have an adhesive strength of 3.0 N/20 mm or more.

APPENDIX 3

In the pressure-sensitive adhesive sheet according to one of Appendices 1 and 2, the acrylic pressure-sensitive adhesive layer before curing may have a Young's modulus of 30 kPa to 200 kPa at 23° C.

APPENDIX 4

In the pressure-sensitive adhesive sheet according to any one of Appendices 1 to 3, the acrylic pressure-sensitive adhesive layer, after curing, may have a gel fraction of 70 mass percent or more.

APPENDIX 5

In the pressure-sensitive adhesive sheet according to any one of Appendices 1 to 4, the acrylic polymer may be derived from monomer components including 0.5 to 30 mass percent of one or more nitrogen-containing monomers.

APPENDIX 6

In the pressure-sensitive adhesive sheet according to any one of Appendices 1 to 5, the acrylic polymer may be derived from monomer components including 1 to 30 mass percent of one or more hydroxy-containing monomers.

APPENDIX 7

In the pressure-sensitive adhesive sheet according to any one of Appendices 1 to 6, the acrylic polymer may be derived from monomer components approximately devoid of acidic-group-containing monomers.

APPENDIX 8

In the pressure-sensitive adhesive sheet according to any one of Appendices 1 to 7, the acrylic polymer may have a weight-average molecular weight of $40 \times 10^4$ to $200 \times 10^4$.

APPENDIX 9

In the pressure-sensitive adhesive sheet according to any one of Appendices 1 to 8, the multifunctional acrylic oligomer may contain two or more (meth)acryloyl groups per molecule.

APPENDIX 10

The pressure-sensitive adhesive sheet according to any one of Appendices 1 to 9, the multifunctional acrylic oligomer may include at least one substance selected from the group consisting of polyester (meth)acrylates, epoxy (meth)acrylates, urethane (meth)acrylates, and bisphenol-A ethylene oxide adduct diacrylates.

APPENDIX 11

The pressure-sensitive adhesive sheet according to any one of Appendices 1 to 10, the multifunctional acrylic oligomer may have a weight-average molecular weight of 400 to 10000.

APPENDIX 12

In the pressure-sensitive adhesive sheet according to any one of Appendices 1 to 11, the multifunctional acrylic oligomer may give a homopolymer having a hardness of 4B or more as measured in conformity with JIS K 5600-5-4.

APPENDIX 13

In the pressure-sensitive adhesive sheet according to any one of Appendices 1 to 12, the acrylic pressure-sensitive adhesive layer may further include one or more photoinitiators.

APPENDIX 14

In the pressure-sensitive adhesive sheet according to Appendix 13, the acrylic pressure-sensitive adhesive layer may contain 0.05 to 40 parts by mass of the multifunctional acrylic oligomer, and 0.05 to 5 parts by mass of the photoinitiator or photoinitiators, each per 100 parts by mass of the acrylic polymer.

APPENDIX 15

In the pressure-sensitive adhesive sheet according to any one of Appendices 1 to 14, the acrylic pressure-sensitive adhesive layer may further include 0.05 to 5 parts by mass of one or more crosslinkers per 100 parts by mass of the acrylic polymer.

APPENDIX 16

In the pressure-sensitive adhesive sheet according to any one of Appendices 1 to 15, the acrylic pressure-sensitive adhesive layer may further include 0.01 to 1 part by mass of one or more silane coupling agents per 100 parts by mass of the acrylic polymer.

The invention claimed is:

1. A pressure-sensitive adhesive sheet comprising
an irradiation-curable, acrylic pressure-sensitive adhesive layer,
the acrylic pressure-sensitive adhesive layer comprising:
an acrylic polymer; and
a multifunctional acrylic oligomer,
the acrylic pressure-sensitive adhesive layer, after curing, having a Young's modulus of 500 kPa to 7,000 kPa at 23° C.,
the acrylic pressure-sensitive adhesive layer, after curing, having an adhesive strength of 3.0 N/20 mm or more,
wherein the adhesive strength is measured according to JIS Z 0237 using a stainless steel plate or a polycarbonate resin plate,
wherein the acrylic polymer is derived from monomer components comprising 13 to 30 mass percent of one or more hydroxy group-containing monomers, and
wherein the acrylic pressure-sensitive adhesive layer comprises 0.05 to less than 20 parts by mass of the multifunctional acrylic oligomer per 100 parts by mass of the acrylic polymer.

2. The pressure-sensitive adhesive sheet according to claim 1,
wherein the acrylic pressure-sensitive adhesive layer before curing has an adhesive strength of 3.0 N/20 mm or more.

3. The pressure-sensitive adhesive sheet according to claim 1,
wherein the acrylic pressure-sensitive adhesive layer before curing has a Young's modulus of 30 kPa to 200 kPa at 23° C.

4. The pressure-sensitive adhesive sheet according to claim 1,
wherein the acrylic pressure-sensitive adhesive layer, after curing, has a gel fraction of 70 mass percent or more.

5. The pressure-sensitive adhesive sheet according to claim 1,
wherein the monomer components comprise 0.5 to 30 mass percent of one or more nitrogen-containing monomers.

6. The pressure-sensitive adhesive sheet according to claim 1,
wherein the monomer components are substantially free from acidic-group-containing monomers.

7. The pressure-sensitive adhesive sheet according to claim 1,
wherein the acrylic polymer has a weight-average molecular weight of $40 \times 10^4$ to $200 \times 10^4$.

8. The pressure-sensitive adhesive sheet according to claim 1,
wherein the multifunctional acrylic oligomer contains two or more (meth)acryloyl groups per molecule.

9. The pressure-sensitive adhesive sheet according to claim 1,
wherein the multifunctional acrylic oligomer comprises at least one substance selected from the group consisting of:
polyester (meth)acrylates;
epoxy (meth)acrylates;
urethane (meth)acrylates; and
bisphenol-A ethylene oxide adduct diacrylates.

10. The pressure-sensitive adhesive sheet according to claim 1,
wherein the multifunctional acrylic oligomer has a weight-average molecular weight of 400 to 10000.

11. The pressure-sensitive adhesive sheet according to claim 1,
wherein the multifunctional acrylic oligomer gives a homopolymer having a hardness of 4B or more as measured in conformity with JIS K 5600-5-4.

12. The pressure-sensitive adhesive sheet according to claim 1,
wherein the acrylic pressure-sensitive adhesive layer further comprises one or more photoinitiators.

13. The pressure-sensitive adhesive sheet according to claim 12,
wherein the acrylic pressure-sensitive adhesive layer further comprises:
0.05 to 5 parts by mass of the photoinitiator,
per 100 parts by mass of the acrylic polymer.

14. The pressure-sensitive adhesive sheet according to claim 1,
wherein the acrylic pressure-sensitive adhesive layer further comprises
0.05 to 5 parts by mass of one or more crosslinkers per 100 parts by mass of the acrylic polymer.

15. The pressure-sensitive adhesive sheet according to claim 1,
wherein the acrylic pressure-sensitive adhesive layer further comprises
0.01 to 1 part by mass of one or more silane coupling agents per 100 parts by mass of the acrylic polymer.

16. The pressure-sensitive adhesive sheet according to claim 5,
wherein the monomer components comprise 15 to 30 mass percent of the one or more nitrogen-containing monomers.

17. The pressure-sensitive adhesive sheet according to claim 5, wherein the one or more nitrogen-containing monomers comprises cyclic N-vinylamide.

* * * * *